(12) United States Patent
Nakamura et al.

(10) Patent No.: US 8,954,335 B2
(45) Date of Patent: Feb. 10, 2015

(54) SPEECH TRANSLATION SYSTEM, CONTROL DEVICE, AND CONTROL METHOD

(75) Inventors: Satoshi Nakamura, Koganei (JP); Eiichiro Sumita, Koganei (JP); Yutaka Ashikari, Koganei (JP); Noriyuki Kimura, Koganei (JP); Chiori Hori, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 289 days.

(21) Appl. No.: 13/501,792
(22) PCT Filed: Mar. 3, 2010
(86) PCT No.: PCT/JP2010/053420
§ 371 (c)(1),
(2), (4) Date: May 17, 2012
(87) PCT Pub. No.: WO2011/048826
PCT Pub. Date: Apr. 28, 2011

(65) Prior Publication Data
US 2012/0221321 A1 Aug. 30, 2012

(30) Foreign Application Priority Data
Oct. 21, 2009 (JP) ................................. 2009-242586

(51) Int. Cl.
*G10L 21/00* (2013.01)
*G10L 25/00* (2013.01)
(Continued)

(52) U.S. Cl.
CPC ............. *G10L 15/32* (2013.01); *G06F 17/2836* (2013.01)
USPC ............ 704/277; 704/2; 704/3; 704/4; 704/7; 704/8; 704/231; 704/258; 704/260

(58) Field of Classification Search
CPC ........................... G06F 17/289; G10L 13/043
USPC ......................... 704/2–8, 231, 258, 260, 277
See application file for complete search history.

(56) References Cited

U.S. PATENT DOCUMENTS 6,266,642 B1 * 7/2001 Franz et al. .................... 704/277
6,996,525 B2 * 2/2006 Bennett et al. ................. 704/231
(Continued)

FOREIGN PATENT DOCUMENTS

JP  2000-148176 A  5/2000
JP  2002-311983 A  10/2002
(Continued)

OTHER PUBLICATIONS

International Search Report for PCT Patent App. No. PCT/JP2010/053420 (Jun. 15, 2010).
(Continued)

*Primary Examiner* — Shaun Roberts
(74) *Attorney, Agent, or Firm* — Cermak Nakajima & McGowan LLP; Tomoko Nakajima

(57) ABSTRACT

Appropriate processing results or appropriate apparatuses can be selected with a control device that selects the most probable speech recognition result by using speech recognition scores received with speech recognition results from two or more speech recognition apparatuses; sends the selected speech recognition result to two or more translation apparatuses respectively; selects the most probable translation result by using translation scores received with translation results from the two or more translation apparatuses; sends the selected translation result to two or more speech synthesis apparatuses respectively; receives a speech synthesis processing result including a speech synthesis result and a speech synthesis score from each of the two or more speech synthesis apparatuses; selects the most probable speech synthesis result by using the scores; and sends the selected speech synthesis result to a second terminal apparatus.

5 Claims, 28 Drawing Sheets

(51) Int. Cl.
*G10L 15/32* (2013.01)
*G06F 17/28* (2006.01)

(56) References Cited

U.S. PATENT DOCUMENTS

| | | | |
|---|---|---|---|
| 7,228,275 B1* | 6/2007 | Endo et al. | 704/235 |
| 7,702,510 B2* | 4/2010 | Eide et al. | 704/260 |
| 7,881,928 B2* | 2/2011 | Gao et al. | 704/231 |
| 8,145,472 B2* | 3/2012 | Shore et al. | 704/2 |
| 8,386,235 B2* | 2/2013 | Duan | 704/5 |
| 8,515,749 B2* | 8/2013 | Stallard | 704/235 |
| 2002/0128840 A1* | 9/2002 | Hinde et al. | 704/258 |
| 2005/0010422 A1 | 1/2005 | Ikeda et al. | |
| 2008/0077386 A1* | 3/2008 | Gao et al. | 704/3 |

FOREIGN PATENT DOCUMENTS

| | | |
|---|---|---|
| JP | 2005-031758 A | 2/2005 |
| JP | 2007-199480 A | 8/2007 |
| JP | 2007-323476 A | 12/2007 |
| JP | 2008-243080 A | 10/2008 |
| JP | 2009-140503 A | 6/2009 |
| WO | WO2005/048509 A2 * | 5/2005 |

OTHER PUBLICATIONS

Office Action for Chinese Patent App. No. 201080046316.4 (Sep. 17, 2013) and English translation thereof.
Office Action for Japanese Patent App. No. 2009-242586 (Jul. 26, 2013) with partial English language translation thereof.
Office Action from Japanese Patent App. No. 2009-242586 (Jan. 23, 2014) with partial English language translation thereof.

* cited by examiner

FIG.11

```
<Source language> Japanese
<Target language> English
<Called party's terminal> 092-1445-1122
<Caller's terminal> 080-1111-2256
<Gender> Female
<Age>  30～39
< Speaker class> Y
<Speaking speed> Fast
         ⋮
```

FIG.12

```
<Source language> English
<Target language> Japanese
<Called party's terminal> 080-1111-2256
<Caller's terminal> 092-1445-1122
<Gender> Male
<Age>  30~39
< Speaker class> Y
<Speaking speed> Middle
              ⋮
```

FIG.13

| ID | Speaker attribute ||||| Speech recognition model identifier |
|---|---|---|---|---|---|---|
| | Language | Gender | Age | Speaking speed | ..... | |
| ...... | ...... | ...... | ...... | ...... | ...... | ...... |
| 17 | Japanese | Female | 30-39 years old | Fast | ..... | JR5 |
| 18 | Japanese | Female | 30-39 years old | Middle | ..... | JR6 |
| 19 | Japanese | Female | 30-39 years old | Slow | ..... | JR7 |
| 20 | Japanese | Female | 40-49 years old | Fast | ..... | JR8 |
| ...... | ...... | ...... | ...... | ...... | ...... | ...... |
| 39 | English | Male | 30-39 years old | Fast | ..... | ER3 |
| 40 | English | Male | 30-39 years old | Middle | ..... | ER4 |
| 41 | English | Male | 30-39 years old | Slow | ..... | ER5 |
| 42 | English | Male | 40-49 years old | Fast | ..... | ER6 |
| ...... | ...... | ...... | ...... | ...... | ...... | ...... |

FIG.14

| ID | Source language | Speaker attribute ||||| Translation model identifier |
| | | Gender | Age | Speaker class | · · · · · | |
| --- | --- | --- | --- | --- | --- | --- |
| ......... | ......... | ......... | ......... | ......... | ......... | ......... |
| 17 | Japanese | Female | 20-29 years old | N | : : : | JT3 |
| 18 | Japanese | Female | 30-39 years old | Y | : : : | JT4 |
| 19 | Japanese | Female | 30-39 years old | N | : : : | JT5 |
| 20 | Japanese | Female | 40-49 years old | Y | : : : | JT6 |
| ......... | ......... | ......... | ......... | ......... | ......... | ......... |
| 39 | English | Male | 20-29 years old | N | : : : | ET6 |
| 40 | English | Male | 30-39 years old | Y | : : : | ET7 |
| 41 | English | Male | 30-39 years old | N | : : : | ET8 |
| 42 | English | Male | 40-49 years old | Y | : : : | ET9 |
| ......... | ......... | ......... | ......... | ......... | ......... | ......... |

FIG.15

| ID | Target language | Speaker attribute ||||  Speech synthesis model identifier |
|---|---|---|---|---|---|---|
| | | Gender | Age | Speaker class | ...... | |
| ...... | ...... | ...... | ...... | ...... | ...... | ...... |
| 17 | English | Female | 20-29 years old | N | ...... | JC8 |
| 18 | English | Female | 30-39 years old | Y | ...... | JC9 |
| 19 | English | Female | 30-39 years old | N | ...... | JC10 |
| 20 | English | Female | 40-49 years old | Y | ...... | JC11 |
| ...... | ...... | ...... | ...... | ...... | ...... | ...... |
| 39 | Japanese | Male | 20-29 years old | N | ...... | EC1 |
| 40 | Japanese | Male | 30-39 years old | Y | ...... | EC2 |
| 41 | Japanese | Male | 30-39 years old | N | ...... | EC3 |
| 42 | Japanese | Male | 40-49 years old | Y | ...... | EC4 |
| ...... | ...... | ...... | ...... | ...... | ...... | ...... |

FIG.16

Speaker attribute

| Gender | ○ Male  ● Female |
|---|---|
| Age | ○ 0~9 years old  ○ 10~19 years old  ○ 20~29 years old<br>● 30~39 years old  ○ 40~49 years old  ○ 50~59 years old<br>○ 60~69 years old  ○ 70 years old |

Used language

○ English  ● Japanese  ○ Chinese
○ Hangeul  ○ French  ⋯

Native

● Yes      ○ No

Used language of called party

● English  ○ Japanese  ○ Chinese
○ Hangeul  ○ French  ⋯

Phone number of caller

080-1111-2256

Phone number of called party

092-1445-1122

( Dial )

FIG.17

| Speech recognition apparatus identifier | Speech recognition processing result | |
|---|---|---|
| | Speech recognition score | Speech recognition result |
| R01 | 0.83 | Ohayogozaimasu |
| R02 | 0.45 | Ohayogozaimasu |
| R03 | 0.95 | Ohayogozaimasu |
| ⋮ | ⋮ | ⋮ |

FIG.18

| Translation apparatus identifier | Translation processing result | |
| --- | --- | --- |
| | Translation score | Translation result |
| T 01 | 0.91 | Good morning. |
| T 02 | 1.00 | Good morning. |
| T 03 | 0.78 | Good morning. |
| ⋮ | ⋮ | ⋮ |

FIG.19
| Speech synthesis apparatus identifier | Speech synthesis processing result | |
|---|---|---|
| | Speech synthesis score | Speech synthesis result |
| J 01 | 0.87 |  |
| J 02 | 0.81 |  |
| J 03 | 0.66 |  |
| ⋮ | ⋮ | ⋮ |

FIG.20

```
<Source language> Japanese
<Target language> English
<Speech recognition server> 186. 221. 1. 27
<Called party's terminal> 092-1445-1122
<Caller's terminal> 080-1111-2256
<Gender> Female
<Age>  30~39
< Speaker class> Y
<Speaking speed> Fast

| Speech recognition apparatus identifier \ Number of times of processing | 1 | 2 | 3 | 4 | 5 |
|---|---|---|---|---|---|
| R01 | 0.83 | 0.98 | 0.92 | 0.99 | 0.88 |
| R02 | 0.45 | 0.60 | 0.54 | 0.80 | 0.71 |
| R03 | 0.95 | 0.80 | 0.81 | 0.72 | 0.68 |
| ⋮ | ⋮ | ⋮ | ⋮ | ⋮ | ⋮ |

FIG.26

```
<?xml version="1.0" encoding="UTF-8" ?>
< STML version="1.0" UtteranceID="8373">
<User ID="Mike"/>
< SR_IN MaxNBest="2" language="en" Task="Dictation" Domain="Travel">
<InputAudioFormat Audio="ADPCM" Endian="Big"/>
<Voice Gender="male" Age="30" Native="no"/>
< OutputTextFormat Form="SurfaceForm"/>

..................
</SR_IN>
</STML>
```

US 8,954,335 B2

SPEECH TRANSLATION SYSTEM, CONTROL DEVICE, AND CONTROL METHOD

This application is a national phase entry under 35 U.S.C. §371 of PCT Patent Application No. PCT/JP2010/053420, filed on Mar. 3, 2010, which claims priority under 35 U.S.C. §119 to Japanese Patent Application No. 2009-242586, filed Oct. 21, 2009, both of which are incorporated by reference.

TECHNICAL FIELD

The present invention relates to a speech translation system or the like that performs speech translation.

BACKGROUND ART

In conventional speech translation systems, there are techniques for improving accuracy in each portion of processing, such as for improving speech recognition accuracy or for improving translation processing accuracy (see Patent Document 1 and Patent Document 2, for example).
[Patent Document 1] JP 2008-243080A (page 1 and FIG. 1, for example)
[Patent Document 2] JP 2009-140503A (page 1 and FIG. 1, for example)

DISCLOSURE OF INVENTION

Problem to be Solved by the Invention

However, in speech translation in the conventional speech translation systems, processing results from a plurality of speech recognition apparatuses, a plurality of translation apparatuses, or a plurality of speech synthesis apparatuses cannot be selectively used, or appropriate apparatuses cannot be selected from among a plurality of speech recognition apparatuses, a plurality of translation apparatuses, or a plurality of speech synthesis apparatuses.

Means for Solving the Problems

A first aspect of the present invention is directed to a speech translation system including a control device, two or more speech recognition apparatuses, two or more translation apparatuses, and two or more speech synthesis apparatuses, wherein the control device includes: a speech receiving unit that receives speech information from a first terminal apparatus that accepts speech of a first user; a speech recognition requesting unit that sends the speech information to each of the two or more speech recognition apparatuses; a speech recognition processing result receiving unit that receives, in response to sending of the speech information, two or more speech recognition processing results each including a speech recognition result for the speech information and a speech recognition score that indicates a probability of speech recognition processing from the two or more speech recognition apparatuses; a speech recognition result selection unit that selects a speech recognition result that is most probable by using the speech recognition scores included in the two or more speech recognition processing results; a translation requesting unit that sends the speech recognition result selected by the speech recognition result selection unit to each of the two or more translation apparatuses; a translation processing result receiving unit that receives, in response to sending of the speech recognition result, a translation processing result including a result of translation performed on the speech recognition result into a target language and a translation score that indicates a probability of translation processing from each of the two or more translation apparatuses; a translation result selection unit that selects a translation result that is most probable by using the translation scores included in two or more translation processing results received by the translation processing result receiving unit; a speech synthesis requesting unit that sends the translation result selected by the translation result selection unit to each of the two or more speech synthesis apparatuses; a speech synthesis processing result receiving unit that receives, in response to sending of the translation result, a speech synthesis processing result including a speech synthesis result for the translation result and a speech synthesis score that indicates a probability of speech synthesis processing from each of the two or more speech synthesis apparatuses; a speech synthesis result selection unit that selects a speech synthesis result that is most probable by using the speech synthesis scores included in two or more speech synthesis processing results received by the speech synthesis processing result receiving unit; and a speech synthesis result sending unit that sends the speech synthesis result selected by the speech synthesis result selection unit to a second terminal apparatus used by a second user, each speech recognition apparatus includes: a speech recognition target speech receiving unit that receives speech information from the control device; a speech recognition unit that performs speech recognition processing on the speech information and acquires a speech recognition processing result including a speech recognition result and a speech recognition score that indicates a probability of speech recognition processing; and a speech recognition processing result sending unit that sends the speech recognition processing result to the control device, each translation apparatus includes: a speech recognition result receiving unit that receives a speech recognition result from the control device; a translation unit that performs translation on the speech recognition result received by the speech recognition result receiving unit into a target language, and acquires a translation processing result including a translation result and a translation score that indicates a probability of translation processing; and a translation processing result sending unit that sends the translation processing result acquired by the translation unit to the control device, each speech synthesis apparatus includes: a translation result receiving unit that receives the translation result from the control device; a speech synthesis unit that performs speech synthesis processing on the translation result, and acquires a speech synthesis processing result including a speech synthesis result and a speech synthesis score that indicates a probability of speech synthesis processing; and a speech synthesis processing result sending unit that sends the speech synthesis processing result to the control device.

With such a configuration, in speech translation, processing results from the plurality of speech recognition apparatuses, the plurality of translation apparatuses, and the plurality of speech synthesis apparatuses can be selectively used.

A second aspect of the present invention is directed to, with respect to the first aspect of the present invention, the speech translation system wherein the control device further includes: a speech recognition apparatus selection unit that selects a speech recognition apparatus to perform subsequent speech recognition processing from among the two or more speech recognition apparatuses with selection processing for results of one or more times of speech recognition in the speech recognition result selection unit; a translation apparatus selection unit that selects a translation apparatus to perform subsequent translation processing from among the two or more translation apparatuses with selection processing for results of one or more times of translation in the translation result selection unit; and a speech synthesis apparatus selection unit that selects a speech synthesis apparatus to perform subsequent speech synthesis processing from among the two or more speech synthesis apparatuses with selection processing for results of one or more times of speech synthesis in the speech synthesis result selection unit, the speech recognition requesting unit sends, after the speech recognition apparatus selection unit selects the speech recognition apparatus, the speech only to the selected speech recognition apparatus, the translation requesting unit sends, after the translation apparatus selection unit selects the translation apparatus, the speech recognition result only to the selected translation apparatus, and the speech synthesis requesting unit sends, after the speech synthesis apparatus selection unit selects the speech synthesis apparatus, the translation result only to the selected speech synthesis apparatus.

With such a configuration, in speech translation, a speech recognition apparatus can be automatically selected from among the plurality of speech recognition apparatuses, a translation apparatus can be automatically selected from among the plurality of translation apparatuses, and a speech synthesis apparatus can be automatically selected from among the plurality of speech synthesis apparatuses.

A third aspect of the present invention is directed to a speech translation system including a control device, two or more speech recognition apparatuses, a translation apparatus, and a speech synthesis apparatus, wherein the control device includes: a speech recognition processing result receiving unit that receives a speech recognition processing result including a speech recognition result for the speech information and a speech recognition score that indicates a probability of speech recognition processing from each of the two or more speech recognition apparatuses; a speech recognition result selection unit that selects a speech recognition apparatus that is most probable by using the speech recognition scores included in the two or more speech recognition processing results received by the speech recognition processing result receiving unit; and a translation requesting unit that sends the speech recognition result selected by the speech recognition result selection unit to the translation apparatus, each speech recognition apparatus includes: a speech receiving unit that receives speech information directly or indirectly from a first terminal apparatus that accepts speech of a first user; a speech recognition unit that performs speech recognition processing on the speech information received by the speech receiving unit, and acquires a speech recognition processing result including a speech recognition result and a speech recognition score that indicates a probability of speech recognition processing; and a speech recognition processing result sending unit that sends the speech recognition processing result acquired by the speech recognition unit to the control device, the translation apparatus includes: a speech recognition result receiving unit that receive the speech recognition result from the control device; a translation unit that performs translation on the speech recognition result received by the speech recognition result receiving unit into a target language, and acquires a translation result; and a translation processing result sending unit that sends the translation result acquired by the translation unit directly or indirectly to the speech synthesis apparatus, the speech synthesis apparatus includes: a translation result receiving unit that receives the translation result; a speech synthesis unit that performs speech synthesis processing on the translation result, and acquires a speech synthesis result; and a speech synthesis processing result sending unit that sends the speech synthesis processing result sending unit that sends the speech synthesis results directly or indirectly to the second terminal apparatus used by the second user.

With such a configuration, in speech translation, a processing result can be selected for use from among processing results from the plurality of speech recognition apparatuses.

A fourth aspect of the present invention is directed to, with respect to the third aspect of the present invention, the speech translation system wherein the control device further includes a speech recognition apparatus selection unit that selects a speech recognition apparatus to perform subsequent speech recognition processing from among the two or more speech recognition apparatuses with selection processing for results of one or more times of speech recognition in the speech recognition result selection unit, and the speech recognition requesting unit sends, after the speech recognition apparatus selection unit selects the speech recognition apparatus, the speech only to the selected speech recognition apparatus.

With such a configuration, in speech translation, a speech recognition apparatus can be automatically selected for use from among the plurality of speech recognition apparatuses.

A fifth aspect of the present invention is directed to a speech translation system including a control device, a speech recognition apparatus, two or more translation apparatuses, and a speech synthesis apparatus, wherein the control device includes: a translation processing result receiving unit that receives a translation processing result including a result of translation performed on a speech recognition result into a target language and a translation score that indicates a probability of translation processing from each of the two or more translation apparatuses; a translation result selection unit that selects a translation result that is most probable by using the translation scores included in two or more translation processing results received by the translation processing result receiving unit; and a speech synthesis requesting unit that sends the translation result selected by the translation result selection unit directly or indirectly to the speech synthesis apparatus, the speech recognition apparatus includes: a speech receiving unit that receives speech information directly or indirectly from a first terminal apparatus that accepts speech of a first user; a speech recognition unit that performs speech recognition processing on the speech information received by the speech receiving unit, and acquires a speech recognition processing result including a speech recognition result; and a speech recognition processing result sending unit that sends the speech recognition processing result acquired by the speech recognition unit directly or indirectly to the translation apparatuses, each translation apparatus includes: a speech recognition result receiving unit that receives the speech recognition result; a translation unit that performs translation on the speech recognition result received by the speech recognition result receiving unit into a target language, and acquires a translation processing result including a translation result and a translation score that indicates a probability of translation processing; and a translation processing result sending unit that sends the translation processing result acquired by the translation unit to the control device, the speech synthesis apparatus includes: a translation result receiving unit that receives the translation result from the control device; a speech synthesis unit that performs speech synthesis processing on the translation result, and acquires a speech synthesis result; and a speech synthesis processing result sending unit that sends the speech synthesis result directly or indirectly to the second terminal apparatus used by the second user.

With such a configuration, in speech translation, a processing result can be selected for use from among processing results from the plurality of translation apparatuses.

A sixth aspect of the present invention is directed to, with the fifth aspect of the present invention, the speech translation system wherein the control device further includes a translation apparatus selection unit that selects a translation apparatus to perform subsequent translation processing from among the two or more translation apparatuses with selection processing for results of one or more times of translation in the translation result selection unit, and the translation requesting unit sends, after the translation apparatus selection unit selects the translation apparatus, the speech recognition result only to the selected translation apparatus.

With such a configuration, in speech translation, a translation apparatus can be selected and automatically used from among the plurality of translation apparatuses.

A seventh aspect of the present invention is directed to a speech translation system including a control device, a speech recognition apparatus, and two or more speech synthesis apparatuses, wherein the control device includes: a speech synthesis processing result receiving unit that receives a speech synthesis processing result including a speech synthesis result and a speech synthesis score that indicates a probability of speech synthesis processing from each of the two or more speech synthesis apparatuses; a speech synthesis result selection unit that selects a speech synthesis result that is most probable by using the speech synthesis scores included in two or more speech synthesis processing results received by the speech synthesis processing result receiving unit; and a speech synthesis result sending unit that sends the speech synthesis result selected by the speech synthesis result selection unit to a second terminal apparatus used by a second user, the speech recognition apparatus includes: a speech receiving unit that receives speech information directly or indirectly from a first terminal apparatus that accepts speech of a first user; a speech recognition unit that performs speech recognition processing on the speech information received by the speech receiving unit, and acquires a speech recognition result; and a speech recognition processing result sending unit that sends the speech recognition result acquired by the speech recognition unit directly or indirectly to the translation apparatus, the translation apparatus includes: a speech recognition result receiving unit that receives the speech recognition result; a translation unit that performs translation on the speech recognition result received by the speech recognition result receiving unit into a target language, and acquires a translation result; and a translation processing result sending unit that sends the translation result acquired by the translation unit directly or indirectly to the speech synthesis apparatuses, each speech synthesis apparatus includes: a translation result receiving unit that receives the translation result; a speech synthesis unit that performs speech synthesis processing on the translation result, and acquires a speech synthesis processing result including a speech synthesis result and a speech synthesis score that indicates a probability of speech synthesis processing; and a speech synthesis processing result sending unit that sends the speech synthesis processing result to the control device.

With such a configuration, in speech translation, a processing result can be selected for use from among processing results from the plurality of speech synthesis apparatuses.

An eighth aspect of the present invention is directed to, with respect to the seventh aspect of the present invention, the speech translation wherein the control device further includes a speech synthesis apparatus selection unit that selects a speech synthesis apparatus to perform subsequent speech synthesis processing from among the two or more speech synthesis apparatuses with selection processing for results of one or more times of speech synthesis in the speech synthesis result selection unit, and the speech synthesis requesting unit sends, after the speech synthesis apparatus selection unit selects the speech synthesis apparatus, the translation result only to the selected speech synthesis apparatus.

With such a configuration, in speech translation, a speech synthesis apparatus can be automatically selected for use from among the plurality of speech synthesis apparatuses.

Effect of the Invention

With the speech translation system of the present invention, in speech translation, an appropriate processing result can be selected from among processing results from server groups each undertaking the same role, and an appropriate server can be selected. As a result, high-quality speech translation can be realized.

BEST MODE FOR CARRYING OUT THE INVENTION

Hereinafter, embodiments of a speech translation system and the like will be described with reference to the attached drawings. Note that elements assigned the same reference numerals in the embodiments perform the same operations, and thus such elements may not be repetitively described.

Embodiment 1

In the present embodiment, a speech translation system in which processing results from a plurality of speech recognition apparatuses, a plurality of translation apparatuses, and a plurality of speech synthesis apparatuses 14 are selectively used is described.

FIG. 1 is a conceptual diagram of a speech translation system of Embodiment 1. The speech translation system includes a first terminal apparatus 10, a control device 11, two or more speech recognition apparatuses 12, two or more translation apparatuses 13, two or more speech synthesis apparatuses 14, and a second terminal apparatus 15.

In the speech translation system, for example, if a Japanese user (user A) of the first terminal apparatus 10 said "Ohayogozaimasu" in Japanese, the speech recognition apparatus 12 performs speech recognition on "Ohayogozaimasu", which is Japanese. The translation apparatus 13 translates a speech recognition result into, for example, English, namely, "Good morning". Next, the speech synthesis apparatus 14 generates speech information of "Good morning" from the English text "Good morning". Then, the utterance "Good morning" is output from the second terminal apparatus 15 of a user B, who is a native English speaker. In the speech translation system, the control device 11 selects a speech recognition result from among a plurality of speech recognition results from the plurality of speech recognition apparatuses 12. Also, the control device 11 selects a translation result from among a plurality of translation results from the plurality of translation apparatuses 13. Also, the control device 11 selects a speech synthesis result from among a plurality of speech synthesis results from the plurality of speech synthesis apparatuses 14.

The first terminal apparatus 10 and the second terminal apparatus 15 are, for example, terminals for talking (including telephones and mobile phones). Here, a description is given assuming that, mainly, the first terminal apparatus 10 is the speaking-side terminal, and the second terminal apparatus 15 is the spoken-side terminal, but needless to say, both terminals are interchangeable. Generally, the user A of the first terminal apparatus 10 and the user B of the second terminal apparatus 15 carry on a conversation while the first terminal apparatus 10 and the second terminal apparatus 15 sequentially and continuously interchange the speaking-side terminal and the spoken-side terminal. The first terminal apparatus 10 and the second terminal apparatus 15 are described assuming that they have similar functions (constituents described below), but needless to say, they do not have to have part of those functions respectively. In the following description, the user (speaker) of the first terminal apparatus 10 is referred to as the user A, and the user (speaker) of the second terminal apparatus 15 is referred to as the user B.

FIG. 2 is a block diagram of the speech translation system in the present embodiment. FIG. 3 is a block diagram of the control device 11. FIG. 4 is a block diagram of the speech synthesis apparatus 12. FIG. 5 is a block diagram of the translation apparatus 13. FIG. 6 is a block diagram of the speech synthesis apparatus 14.

The first terminal apparatus 10 includes a first speech translation control information storage unit 100, a first speech accepting unit 101, a first speech sending unit 102, a first speech translation control information sending unit 103, a first speech receiving unit 104, and a first speech output unit 105.

The control device 11 includes a speech translation control information receiving unit 1100, a speech receiving unit 1101, a speech recognition requesting unit 1102, a speech recognition processing result receiving unit 1103, a speech recognition result selection unit 1104, a translation requesting unit 1105, a translation processing result receiving unit 1106, a translation result selection unit 1107, a speech synthesis requesting unit 1108, a speech synthesis processing result receiving unit 1109, a speech synthesis result selection unit 1110, and a speech synthesis result sending unit 1111.

Each speech recognition apparatus 12 includes a speech recognition target speech receiving unit 121, a speech recognition unit 122, and a speech recognition processing result sending unit 123.

Each translation apparatus 13 includes a speech recognition result receiving unit 131, a translation unit 132, and a translation processing result sending unit 133.

Each speech synthesis apparatus 14 includes a translation result receiving unit 141, a speech synthesis unit 142, and a speech synthesis processing result sending unit 143.

The second terminal apparatus 15 includes a second speech translation control information storage unit 150, a second speech accepting unit 151, a second speech sending unit 152, a second speech translation control information sending unit 153, a second speech receiving unit 154, and a second speech output unit 155.

Hereinafter, the function, implementing means, and the like of each components are described. However, since the functions of the components of the first terminal apparatus 10 and the functions of the corresponding components of the second terminal apparatus 15 are the same (e.g., the functions of the first speech accepting unit 101 and of the second speech accepting unit 151 are the same), only the components of the first terminal apparatus 10 are described.

The first speech translation control information storage unit 100 constituting the first terminal apparatus 10 can have stored therein speech translation control information. The speech translation control information is information used when speech translation is performed. The speech translation control information includes information with which apparatuses such as the speech recognition apparatuses 12, the translation apparatuses 13, and the speech synthesis apparatuses 14 respectively perform speech recognition, translation, and speech synthesis, and send processing results. The speech translation control information may include, for example, a speech recognition apparatus identifier (e.g., IP address or MAC address) which is information for identifying the speech recognition apparatus to perform speech recognition, a translation apparatus identifier (e.g., IP address or MAC address) for identifying the translation apparatus to perform translation, and a speech synthesis apparatus identifier (e.g., IP address or MAC address) which is information for identifying the speech synthesis apparatus to perform speech synthesis, or the like. Also, the speech translation control information may include, for example, information indicating a source language (e.g., "日本語" "Japanese") and information indicating a target language (e.g., "英語" "English"). Also, the speech translation control information may include, for example, a first terminal apparatus identifier (e.g., telephone number or IP address) which is information for identifying the first terminal apparatus 10, a first user identifier (registered ID of the user A) which is information for identifying the user A, who is the calling user, a second terminal apparatus identifier (e.g., telephone number or IP address) which is information for identifying the second terminal apparatus 15, a second user identifier (registered ID of the user B) which is information for identifying the user B, who is the called user, and the like. Also, the speech translation control information may include, for example, speaker attributes. The speaker attributes refer to attribute values of a speaker. The speaker attributes are, for example, a speaker's gender, age, speaking speed, speaker class (degree of skill related to the language used by the speaker in terms of difficulty in used words and grammatical correctness, etc.), and the like. The speaker class refers to information indicating a degree of difficulty in used words, information indicating a degree of politeness of used terms, information indicating a degree of grammatical correctness, information indicating a multiple degree of these points, information indicating whether or not the speaker is a native speaker, and the like. The speaker attributes may also include speaker's emotions (happy, sad, etc.), and the like. Needless to say, there is no restriction to the content of the speaker attributes.

The first speech accepting unit 101 accepts speech from the user (user A) of the first terminal apparatus 10.

The first speech sending unit 102 sends speech information configured from the speech accepted by the first speech accepting unit 101. The speech is generally sent to the control device 11, but may also be sent to each of the two or more speech recognition apparatuses 12.

The first speech translation control information sending unit 103 sends the speech translation control information stored in the first speech translation control information storage unit 100 to the control device 11. Note that the first speech translation control information sending unit 103 may also send the speech translation control information to the speech recognition apparatuses 12, the translation apparatuses 13, or the speech synthesis apparatuses 14.

The first speech receiving unit 104 receives speech information that is a result of speech translation performed on speech information configured from speech uttered by the user B of the second terminal apparatus 15. This speech information generally is information on speech translated into a language that the user A of the first terminal apparatus 10 can understand. This speech information generally is information sent from the second terminal apparatus 15 via the control device 11, the speech recognition apparatuses 11, the translation apparatuses 13, and the speech synthesis apparatuses 14.

The first speech output unit 105 outputs the speech information received by the first speech receiving unit 104. Here, output generally refers to output of speech to a speaker.

The speech translation control information receiving unit 1100 in the control device 11 receives the speech translation control information from the first terminal apparatus 10.

Referring to FIG. 3, the speech receiving unit 1101 receives speech information from the first terminal apparatus 10 that accepts speech of the first user (user A).

The speech recognition requesting unit 1102 sends the speech information received by the speech receiving unit 1101 to each of the two or more speech recognition apparatuses 12. The speech recognition requesting unit 1102 may send, as well as the speech information, the speech translation control information received by the speech translation control information receiving unit 1100 to each of the two or more speech recognition apparatuses 12.

The speech recognition processing result receiving unit 1103 receives a speech recognition processing result from each of the two or more speech recognition apparatuses 12 in response to sending of the speech information. The speech recognition processing result includes a result of speech recognition of the speech information and a speech recognition score that indicates the probability of speech recognition processing. Note that the speech recognition result generally is a character string. The speech recognition score is a numerical value indicating the reliability of speech recognition processing or a character indicating the reliability rank, such as likelihood. The speech recognition result receiving unit 1103 may alternatively receive the speech recognition processing result only from one of the speech recognition apparatuses 12.

The speech recognition result selection unit 1104 selects the most probable speech recognition result by using the speech recognition scores included in the two or more speech recognition processing results. The most probable speech recognition result refers to the speech recognition result paired with the speech recognition score with the best speech recognition score. Note that if a plurality of the same speech recognition scores exist, the speech recognition result selection unit 1104 selects, for example, the speech recognition result sent from the speech recognition apparatus 12 having more speech recognition results that have been selected so far is selected. In this case, the speech recognition result selection unit 1104 at least temporarily accumulates one or more past speech recognition scores sent from the speech recognition apparatuses 12 in association with the speech recognition apparatus identifiers, and selects the speech recognition result by using those one or more past speech recognition scores. Further, if a plurality of the same speech recognition scores exist, the speech recognition result selection unit 1104 may select the speech recognition result sent from the speech recognition apparatus 12 of which the previous speech recognition score is better, for example. Note that if the speech recognition processing result receiving unit 1103 receives only a single speech recognition result, the speech recognition result selection unit 1104 passes this single speech recognition result to the translation requesting unit 1105. Such process is also included in the speech recognition result selection.

The translation requesting unit 1105 sends the speech recognition result selected by the speech recognition result selection unit 1104 to each of the two or more translation apparatuses 13. The translation requesting unit 1105 may send, as well as the speech information, the speech translation control information received by the speech translation control information receiving unit 1100 to each of the two or more translation apparatuses 13.

The translation processing result receiving unit 1106 receives, in response to sending of the speech recognition result, a result of translation performed on the speech recognition result into a target language and a translation processing result including a translation score that indicates the probability of translation processing from each of the two or more translation apparatuses 13. The translation score is a numerical value indicating the reliability of translation processing or a character indicating the reliability rank, such as likelihood. Note that the translation processing result receiving unit 1106 may alternatively receive the translation processing result only from one of the translation apparatuses 13.

The translation result selection unit 1107 selects the most probable translation result by using the translation scores included in the two or more translation processing results received by the translation processing result receiving unit 1106. The most probable translation result refers to the translation result paired with the best translation score. Note that if a plurality of the same translation scores exist, the translation result selection unit 1107 selects, for example, the translation result sent from the translation apparatus 13 having more translation results that have been selected so far. In this case, the translation result selection unit 1107 at least temporarily accumulates one or more past translation scores sent from the translation apparatuses 13 in association with the translation apparatus identifiers, and selects the translation result by using those one or more past translation scores. Further, if a plurality of the same translation scores exist, the translation result selection unit 1107 may select the translation result sent from the translation apparatus 13 of which the previous translation score is better, for example. Note that if the translation processing result receiving unit 1106 receives only a single translation result, the translation result selection unit 1107 passes this single translation result to the speech synthesis requesting unit 1108. Such process is also included in the translation result selection.

The speech synthesis requesting unit 1108 sends the translation result selected by the translation result selection unit 1107 to each of the two or more speech synthesis apparatuses 14. The speech synthesis requesting unit 1108 may send, as well as the translation result, the speech translation control information received by the speech translation control information receiving unit 1100 to each of the two or more translation apparatuses 13.

The speech synthesis processing result receiving unit 1109 receives, in response to sending of the translation result, a result of speech synthesis performed on the translation result and a speech synthesis processing result including a speech synthesis score that indicates the probability of speech synthesis processing from each of the two or more speech synthesis apparatuses 14. The speech synthesis score is a numerical value indicating the reliability of speech synthesis processing or a character indicating the reliability rank, such as likelihood. The speech synthesis processing result receiving unit 1109 may alternatively receive the speech synthesis result only from one of the speech synthesis apparatuses 14.

The speech synthesis result selection unit 1110 selects the most probable speech synthesis result by using the speech synthesis scores included in the two or more speech synthesis processing results received by the speech synthesis processing result receiving unit 1109. The most probable speech synthesis result refers to the speech synthesis result paired with the best speech synthesis score. Note that if a plurality of the same speech synthesis scores exist, the speech synthesis result selection unit 1110 selects, for example, the speech synthesis result sent from the speech synthesis apparatus 14 having more speech synthesis results that have been selected so far. In this case, the speech synthesis result selection unit 1110 at least temporarily accumulates one or more past speech synthesis scores sent from the speech synthesis apparatuses 14 in association with the speech synthesis apparatus identifiers, and selects the speech synthesis result by using those one or more past speech synthesis scores. Further, if a plurality of the same speech synthesis scores exist, the speech synthesis result selection unit 1110 may select the speech synthesis result sent from the speech synthesis apparatus 14 of which the previous speech synthesis score is better, for example. Note that if the speech synthesis processing result receiving unit 1109 receives only a single speech synthesis result, the speech synthesis result selection unit 1110 passes this single speech synthesis result to the speech synthesis result sending unit 1111. Such process is also included in the speech synthesis result selection.

The speech synthesis result sending unit 1111 sends the speech synthesis result selected by the speech synthesis result selection unit 1110 to the second terminal apparatus 15 used by the second user.

Referring to FIG. 4, the speech recognition target speech receiving unit 121 in the speech recognition apparatus 12 receives the speech information from the control device 11. The speech recognition target speech receiving unit 121 may receive, as well as the speech information, the speech translation control information. Also, the speech recognition target speech receiving unit 121 may receive the speech information from the first terminal apparatus 10.

The speech recognition unit 122 performs speech recognition processing on the speech, and acquires a speech recognition processing result. The speech recognition processing result includes a speech recognition result and a speech recognition score that indicates the probability of the speech recognition processing. The speech recognition result generally is a character string. It is preferable that the speech recognition unit 122 performs speech recognition processing by using the speaker attributes described in the speech translation control information. That is, the speech recognition unit 122 has stored therein, for example, a plurality of speech recognition models in association with speaker attributes (such as gender and age group) respectively, and performs speech recognition by selecting and using one of the speech recognition models associated with the speaker attribute contained in the speech translation control information. The speech recognition models refer to, for example, acoustic models based on a Hidden Markov Model (HMM). However, the speech recognition models do not necessarily have to be acoustic models based on HMM. The speech recognition models may alternatively be acoustic models based on other models such as a single Gaussian distribution model, a probability model (GMM: Gaussian Mixture model), and a statistical model.

The speech recognition processing result sending unit 123 sends the speech recognition processing result to the control device 11. The speech recognition processing result sending unit 123 may also send the speech recognition processing result to the one or more translation apparatuses 13. It is preferable that the speech recognition processing result sending unit 123 sends the speech recognition processing result with the speech recognition apparatus identifier. In this case, the speech recognition processing result sending unit 123 has stored therein the speech recognition apparatus identifiers. The speech recognition apparatus identifiers are, for example, IP addresses of the speech recognition apparatuses 12.

Referring to FIG. 5, the speech recognition result receiving unit 131 in the translation apparatus 13 receives the speech recognition result from the control device 11. The speech recognition result receiving unit 131 may alternatively receive the speech recognition result from the speech recognition apparatus 12. It is preferable that the speech recognition result receiving unit 131 receives, as well as the speech recognition result, the speech translation control information.

The translation unit 132 translates the speech recognition result received by the speech recognition result receiving unit 131 into a target language, and acquires a translation processing result. The translation processing result includes a translation result and a translation score that indicates the probability of translation processing. The translation result is a character string indicating a sentence or the like translated into the target language. It is preferable that the translation unit 132 performs translation processing by using the speech translation control information received by the speech recognition result receiving unit 131. That is, it is preferable that the translation unit 132 has stored therein, for example, a plurality of translation models in association with a plurality of source languages and target languages, or speaker attributes, selects one of the translation models based on the information on the source language and the target language, or/and the speaker attributes contained in the speech translation control information, and performs translation processing by using this translation model. Note that the translation models refer to information (lexical information) used to perform translation, which may or may not include so-called language models.

The translation processing result sending unit 133 sends the translation processing result acquired by the translation unit 132 to the control device 11. The translation processing result sending unit 133 may also send the translation processing result to the one or more speech synthesis apparatuses 14.

Referring to FIG. 6, the translation result receiving unit 141 in the speech synthesis apparatus 14 receives the translation result from the control device 11. The translation result receiving unit 141 may alternatively receive the translation result from the translation apparatus 13. The translation result receiving unit 141 may receive, as well as the translation result, the speech translation control information.

The speech synthesis unit 142 performs speech synthesis processing on the translation result, and acquires a speech synthesis processing result. The speech synthesis processing result includes a speech synthesis result and a speech synthesis score that indicates the probability of speech synthesis processing. The speech synthesis result is speech information that is a speech output target. It is preferable that the speech synthesis unit 142 performs speech synthesis processing by using the speech translation control information received by the speech recognition result receiving unit 131. That is, it is preferable the speech synthesis unit 142 has stored therein, for example, a plurality of speech synthesis models in association with target languages, speaker attributes, and the like, selects one of the speech synthesis models based on the information on the target language or/and the speaker attributes contained in the speech translation control information, and performs speech synthesis processing by using this speech synthesis model. Note that the speech synthesis models refer to information (e.g., corpus) used to perform speech synthesis.

The speech synthesis processing result sending unit 143 sends the speech synthesis processing result to the control device 11. The speech synthesis processing result sending unit 143 may also send the speech synthesis processing result to the second terminal apparatus 15.

The first speech translation control information storage unit 100 in the first terminal apparatus 10 is preferably a nonvolatile recording medium, but can be realized also by a volatile recording medium. There is no restriction to the process by which speech translation control information is stored in the first speech translation control information storage unit 100. For example, the speech translation control information may be stored in the first speech translation control information storage unit 100 via a recording medium, or the speech translation control information sent via a communication line or the like may be stored in the first speech translation control information storage unit 100. Alternatively, the speech translation control information input via an input device may be stored in the first speech translation control information storage unit 100.

The first speech accepting unit 101 can be realized by, for example, a microphone.

The first speech sending unit 102, the first speech translation control information sending unit 103, the speech recognition requesting unit 1102, the translation requesting unit 1105, the speech synthesis requesting unit 1108, the speech synthesis result sending unit 1111, the speech recognition processing result sending unit 123, the translation processing result sending unit 133, and the speech synthesis processing result sending unit 143 are generally realized by wireless or wired communication means, but may also be realized by broadcasting means.

The first speech receiving unit 104, the speech translation control information receiving unit 1100, the speech receiving unit 1101, the speech recognition result receiving unit 1103, the translation processing result receiving unit 1106, the speech synthesis processing result receiving unit 1109, the speech recognition target speech receiving unit 121, the speech recognition result receiving unit 131, and the translation result receiving unit 141 are generally realized by wireless or wired communication means, but may also be realized by means for receiving broadcasting.

The first speech output unit 105 may or may not include an output device such as a speaker. The first speech output unit 105 can be realized by driver software of an output device, or driver software of an output device and an output device, etc.

The speech recognition result selection unit 1104, the translation result selection unit 1107, and the speech synthesis result selection unit 1110 in the control device 11, the speech recognition unit 122, the translation unit 132, and the speech synthesis unit 142 can be generally realized by an MPU, a memory, or the like. The processing procedures of the speech recognition result selection unit 1104 and so on are generally realized by software, and the software therefor is recorded in a recording media such as a ROM. However, it may also be realized by hardware (dedicated circuit).

Next, an operation performed by the speech translation system will be described. First, the operation of the first terminal apparatus 10 is described using the flowchart in FIG. 6.

The first speech accepting unit 101 in the first terminal apparatus 10, upon receiving speech from the user A, converts (e.g., digital-modulates) the speech into speech information that can be sent, and the first speech sending unit 102 sends this speech information to the control device 11. In this case, generally, the first speech sending unit 102 sends the speech information with the first terminal apparatus identifier to the control device 11. Also, the first speech translation control information sending unit 103 sends the speech translation control information stored in the first speech translation control information storage unit 100 at the time of sending of the speech information. Also, the first speech receiving unit 104 receives a speech synthesis result obtained from speech recognition, translation, and speech synthesis performed on speech information configured from speech uttered by the user B, and the first speech output unit 105 outputs the speech of the speech recognition result.

Next, an operation of the control device 11 is described using the flowchart in FIG. 7.

(Step S701) The speech receiving unit 1101 determines whether or not speech information has been received from the first terminal apparatus 10. If the speech information has been received, the procedure proceeds to step S702, and if not, the procedure returns to step S701. It is assumed here that the speech translation control information receiving unit 1101 receives the speech translation control information when the speech receiving unit 1100 receives the speech information.

(Step S702) The speech recognition requesting unit 1102 sends the speech information received at step S701 to each of the two or more speech recognition apparatuses 12. The speech recognition requesting unit 1102 also sends the speech translation control information received by the speech translation control information receiving unit 1101 to each of the two or more speech recognition apparatuses 12. It is assumed that the speech recognition requesting unit 1102 holds in advance two or more speech recognition apparatus identifiers which are information used for communication with the two or more speech recognition apparatuses 12. The speech recognition requesting unit 1102 may select one or more speech recognition apparatuses 12 by using the speech translation control information (such as speaker attributes and speech recognition apparatus identifiers) and send the speech information to the selected one or more speech recognition apparatuses 12. In this case, the speech recognition requesting unit 1102 has stored therein conditions including speaker attributes and the speech recognition apparatus identifiers in association with each other.

(Step S703) The speech recognition processing result receiving unit 1103 determines, in response to sending of the speech information or the like at step S702, whether or not a speech recognition processing result has been received from each of the two or more speech recognition apparatuses 12. If the speech recognition processing result has been received, the procedure proceeds to step S704, and if not, the procedure returns to step S703. Note that the speech recognition processing result receiving unit 1103 generally waits until the speech recognition processing results are received from all speech recognition apparatuses 12, but if a predetermined time has past after the sending of the speech information or the like, the receiving process at step S703 may be finished.

(Step S704) The speech recognition result selection unit 1104 selects the speech recognition result with the highest (best) speech recognition score by using the speech recognition scores included in the two or more speech recognition processing results received at step S703, and locates the selected speech recognition result on a memory.

(Step S705) The speech recognition result selection unit 1104 determines whether or not there are a plurality of the speech recognition results with the highest speech recognition score. That is, the speech recognition result selection unit 1104 determines whether or not a plurality of the speech recognition results are selected at step S704. If there are a plurality of the speech recognition results with the highest speech recognition score, the procedure proceeds to step S706, and if not, the procedure proceeds to step S707.

(Step S706) The speech recognition result selection unit 1104 selects the speech recognition result from one of the speech recognition apparatus 12 from among a plurality of the speech recognition results paired with the same speech recognition score by using the past speech recognition scores of the two or more speech recognition apparatuses 12. That is, for example, the speech recognition result selection unit 1104 may calculate an average of the past speech recognition scores of each speech recognition apparatus 12 and select the speech recognition result from the speech recognition apparatus 12 with the best average speech recognition score. Alternatively, the speech recognition result selection unit 1104 may select the speech recognition result from the speech recognition apparatus 12 having the best previous speech recognition score, or the like.

(Step S707) The translation requesting unit 1105 sends the speech recognition result selected by the speech recognition result selection unit 1104 to each of the two or more translation apparatuses 13. The translation requesting unit 1105 also sends the speech translation control information received by the speech translation control information receiving unit 1100 to each of the two or more translation apparatuses 13. It is assumed that the translation requesting unit 1105 holds in advance two or more translation apparatus identifiers which are information used for communication with the two or more translation apparatuses 13. The translation requesting unit 1105 may select one or more translation apparatuses 13 by using the speech translation control information (such as speaker attributes and translation apparatus identifiers) and sends the speech recognition result to the selected one or more translation apparatuses 13. In this case, the translation requesting unit 1105 has stored therein conditions including speaker attributes and the translation apparatus identifiers in association with each other.

(Step S708) The translation processing result receiving unit 1106 determines, in response to sending of the speech recognition result or the like at step S707, whether or not a translation processing result has been received from each of the two or more translation apparatuses 13. If the translation processing result has been received, the procedure proceeds to step S709, and if not, the procedure returns to step S708. Note that the translation processing result receiving unit 1106 generally waits until the translation processing results are received from all translation apparatuses 13, but if a predetermined time has past after the sending of the speech recognition results or the like, the receiving process at step S708 may be finished.

(Step S709) The translation result selection unit 1107 selects the translation result with the highest (best) translation score by using the translation scores included in the two or more translation processing results received at step S708, and locates the selected translation result on the memory.

(Step S710) The translation result selection unit 1107 determines whether or not there are a plurality of the translation results with the highest translation score. That is, the translation result selection unit 1107 determines whether or not a plurality of the translation results are selected at step S709. If there are a plurality of the translation results with the highest translation score, the procedure proceeds to step S711, and if not, the procedure proceeds to step S712.

(Step S711) The translation result selection unit 1107 selects the translation result from one of the translation apparatus 13 from among a plurality of the translation results paired with the same translation score by using the past translation scores of the two or more translation apparatuses 13. That is, for example, the translation result selection unit 1107 may calculate an average of the past translation scores of each translation apparatus 13 and select the translation result from the translation apparatus 13 with the best average translation score. Alternatively, the translation result selection unit 1107 may select the translation result from the translation apparatus 13 having the best previous translation score, or the like.

(Step S712) The speech synthesis requesting unit 1108 sends the translation result selected by the translation result selection unit 1107 to each of the two or more speech synthesis apparatuses 14. The speech synthesis requesting unit 1108 also sends the speech translation control information received by the speech translation control information receiving unit 1100 to each of the two or more speech synthesis apparatuses 14. It is assumed that the speech synthesis requesting unit 1108 holds in advance two or more speech synthesis apparatus identifiers which are information used for communication with the two or more speech synthesis apparatuses 14. The speech synthesis requesting unit 1108 may select one or more speech synthesis apparatuses 14 by using the speech translation control information (such as speaker attributes and speech synthesis apparatus identifiers) and send the translation result to the selected one or more speech synthesis apparatuses 14. In this case, the speech synthesis requesting unit 1108 has stored therein conditions including speaker attributes and the speech synthesis apparatus identifiers in association with each other.

(Step S713) The speech synthesis processing result receiving unit 1109 determines, in response to sending of the translation result or the like at step S712, whether or not a speech synthesis processing result has been received from each of the two or more speech synthesis apparatuses 14. If the speech synthesis processing result has been received, the procedure proceeds to step S714, and if not, the procedure returns to step S713. Note that the speech synthesis processing result receiving unit 1109 generally waits until the speech synthesis results are received from all speech synthesis apparatuses 14, but if a predetermined time has past after the sending of the translation results or the like, the receiving process at step S713 may be finished.

(Step S714) The speech recognition result selection unit 1110 selects the speech synthesis result with the highest (best) speech synthesis score by using the speech synthesis scores included in the two or more speech synthesis processing results received at step S713, and locates the selected speech synthesis result on the memory.

(Step S715) The speech synthesis result selection unit 1110 determines whether or not there are a plurality of the speech synthesis results with the highest speech recognition score. That is, the speech synthesis result selection unit 1110 determines whether or not a plurality of the speech synthesis results are selected at step S714. If there are a plurality of the speech synthesis results with the highest speech synthesis score, the procedure proceeds to step S716, and if not, the procedure proceeds to step S717.

(Step S716) The speech synthesis result selection unit 1110 selects the speech synthesis result from one of the speech synthesis apparatus 14 from among a plurality of the speech synthesis results paired with the same speech synthesis score by using the past speech synthesis scores of the two or more speech synthesis apparatuses 14. That is, for example, the speech synthesis result selection unit 1110 may calculate an average of the past speech synthesis scores of each speech synthesis apparatus 14 and select the speech synthesis result from the speech synthesis apparatus 14 with the best average speech synthesis score. Alternatively, the speech synthesis result selection unit 1110 may select the speech synthesis result from the speech synthesis apparatus 14 having the best previous speech synthesis score.

(Step S717) The speech synthesis result sending unit 1111 sends the speech synthesis result selected by the speech synthesis result selection unit 1110 to the second terminal apparatus 15 used by the user B. Then, the procedure returns to step S701.

Note that in the flowchart in FIG. 7, when there are a plurality of speech recognition results, translation results, or speech synthesis results respectively corresponding the highest score, one of the speech recognition results, translation results, or speech synthesis results is selected by using the past scores. However, one of the speech recognition results, translation results, or speech synthesis results may alternatively be selected randomly.

Also in the flowchart in FIG. 7, it is preferable that the speech recognition scores of the respective speech recognition apparatuses, the translation scores of the respective translation apparatuses, and the speech synthesis scores of the respective speech synthesis apparatuses are accumulated at least temporarily.

Further, in the flowchart in FIG. 7, the processing ends due to powering off or interruption for aborting the processing.

Next, an operation of each speech recognition apparatus 12 is described using the flowchart in FIG. 8.

(Step S801) The speech recognition target speech receiving unit 121 determines whether or not speech information and speech translation control information have been received from the control device 11. If the speech information and the like have been received, the procedure proceeds to 5802, and if not, the procedure returns to step S801.

(Step S802) The speech recognition unit 122 acquires the speech translation control information received at step S801.

(Step S803) The speech recognition unit 122 selects a speech recognition model by using the speech translation control information acquired at step S802. For example, conditions including speaker attributes (such as gender, age group, and speaker level) are stored in association with the speech recognition models, and the speech recognition unit 122 selects the speech recognition model paired with the condition that matches the speaker attributes contained in the speech translation control information. Note that each speech recognition model includes, for example, an acoustic model and a language model.

(Step S804) The speech recognition unit 122 acquires the speech information received at step S801.

(Step S805) The speech recognition unit 122 performs speech recognition processing on the speech information acquired at step S804 by using the speech recognition model selected at step S803. Then, the speech recognition unit 122 acquires a speech recognition result (generally, character string) and a speech recognition score (e.g., likelihood).

(Step S806) The speech recognition unit 122 configures a speech recognition processing result from the speech recognition result and the speech recognition score acquired at step S805.

(Step S807) The speech recognition processing result sending unit 123 sends the speech recognition processing result with the speech recognition identifier to the control device 11. Note that the speech recognition processing result sending unit 123 has stored therein the speech recognition apparatus identifiers. Then, the procedure returns to step S801.

Note that in the flowchart in FIG. 8, the speech recognition processing result sending unit 123 may send the speech recognition processing result and the like to one or more translation apparatuses 13.

In the flowchart in FIG. 8, the processing ends due to powering off or interruption for aborting the processing.

Next, an operation of each translation apparatus 13 is described using the flowchart in FIG. 9.

(Step S901) The speech recognition result receiving unit 131 determines whether or not a speech recognition result and speech translation control information have been received from the control device 11. If the speech recognition result and the like have been received, the procedure proceeds to step S902, and if not, the procedure returns to step S901. Note that the speech recognition result receiving unit 131 may receive the speech recognition result and the like from the speech recognition apparatuses 12.

(Step S902) The translation unit 132 acquires the speech translation control information received at step S901.

(Step S903) The translation unit 132 selects a translation model by using the speech translation control information acquired at step S902. For example, source languages, target languages, and/or conditions including speaker attributes (such as gender, age group, and speaker level) has been stored in association with the speech recognition models, and the translation unit 132 selects the translation model paired with the condition that matches the source language, target language, and/or speaker attributes contained in the speech translation control information.

(Step S904) The translation unit 132 acquires the speech recognition result received at step S901.

(Step S905) The translation unit 132 performs translation on the speech recognition result acquired at step S904 by using the translation model selected at step S903. Then, the translation unit 132 acquires a translation result (generally, character string representing a sentence in the target language) and a translation score (e.g., likelihood).

(Step S906) The translation unit 132 configures a translation processing result from the translation result and the translation score acquired at step S905.

(Step S907) The translation processing result sending unit 133 sends the translation processing result with the translation apparatus identifier to the control device 11. Note that the translation processing result sending unit 133 has stored therein the translation apparatus identifiers. Then, the procedure returns to step S901.

Note that in the flowchart in FIG. 9, the translation processing result sending unit 133 may send the translation processing result and the like to one or more speech synthesis apparatuses 14.

In the flowchart in FIG. 9, the processing ends due to powering off or interruption for aborting the processing.

Next, an operation of each speech synthesis apparatus 14 is described using the flowchart in FIG. 10.

(Step S1001) The translation result receiving unit 141 determines whether or not a translation result and speech translation control information have been received from the control device 11. If the translation result and the like have been received, the procedure proceeds to step S1002, and if not, the procedure returns to step S1001.

(Step S1002) The speech synthesis unit 142 acquires the speech translation control information received at step S1001.

(Step S1003) The speech synthesis unit 142 selects a speech synthesis model by using the speech translation control information acquired at step S1002. For example, conditions including speaker attributes (such as gender, age group, and speaker level) has been stored in association with speech synthesis models, and the speech synthesis unit 142 selects the speech synthesis model paired with the condition that matches the speaker attributes contained in the speech translation control information.

(Step S1004) The speech synthesis unit 142 acquires the translation result received at step S1001.

(Step S1005) The speech synthesis unit 142 performs speech synthesis processing on the translation result received at step S1004 by using the speech synthesis model selected at step S1003. Then, the speech synthesis unit 142 acquires a speech synthesis result (generally, speech information) and a speech synthesis score (e.g., likelihood).

(Step S1006) The speech synthesis unit 142 configures a speech synthesis processing result from the speech synthesis result and the speech synthesis score acquired at step S1005.

(Step S1007) The speech synthesis processing result sending unit 143 sends the speech synthesis result with the speech synthesis apparatus identifier to the control device 11. Note that the speech synthesis processing result sending unit 143 has stored therein the speech synthesis apparatus identifiers.

Note that in the flowchart in FIG. 10, the speech synthesis processing result sending unit 143 may send the speech synthesis processing result and the like to the second terminal apparatus 15.

In the flowchart in FIG. 10, the processing ends due to powering off or interruption for aborting the processing.

Hereinafter, a specific operation of the speech translation system in the present embodiment is described with reference to FIG. 1 which is a conceptual diagram of the speech translation system.

Now, the user A of the first terminal apparatus 10 is a 37-year-old female who speaks Japanese, and is a native Japanese speaker. The user B of the second terminal apparatus 15 is a 38-year-old male who speaks English, and is a native English speaker.

The speech translation control information shown in FIG. 11 has been stored in the first speech translation control information storage unit 100 in the first terminal apparatus 10. The speech translation control information here contains information indicating a source language and a target language, an identifier of the second terminal apparatus that is the called party's terminal, an identifier of the first terminal apparatus that is the caller's terminal, and information on the gender, age group and speaker class of the user A. Here, the speaker class indicates whether or not a speaker is a native speaker of the language in use. If the speaker is a native speaker, the attribute value is "Y," and if not, the attribute value is "N." The "speaking speed", which is the speed of speaking, can take any of values of "fast," "middle," and "slow". "Fast" indicates, for example, the speaking speed of "5 syllables per second" or higher, "middle" indicates, for example, the speaking speed of "3 syllables per second" or higher and lower than "5 syllables per second", and "slow" indicates, for example, the speaking speed of lower than "3 syllables per second". However, there is no restriction to types of categorization, methods of categorization, or the like for the "speaking speed".

The speech translation control information shown in FIG. 12 has been stored in the second speech translation control information storage unit 150 in the second terminal apparatus 15.

The speech translation unit 122 in any one of the speech recognition apparatuses 12 has stored therein the speech recognition model selection information management table shown in FIG. 13. The speech recognition server selection information management table has stores therein one or more records of attribute values of "language", "speaker attribute", and "speech recognition model identifier". The "speaker attribute" here includes "gender", "age", "speaking speed", and the like. The "speech recognition model identifier", which is information for identifying a speech recognition model, is used to read out the speech recognition models, for example. Here, for example, the "speech recognition model identifier" is a name or the like of a file in which a speech recognition model has been stored. The speech recognition unit 122 has stored therein a plurality of speech recognition models corresponding to the speech recognition model identifiers.

The translation unit 132 in any one of the translation apparatuses 13 has stored therein the translation model selection information management table shown in FIG. 14. The translation model selection information management table has stored therein one or more records of attribute values of "ID", "source language", "speaker attribute", and "translation model identifier". The "speaker attribute" here includes "gender", "age", "speaker class", and the like. The "translation model identifier", which is information for identifying each translation model, is used to read out the translation models, for example. Here, for example, the "translation model identifier" is a name or the like of a file in which each translation model is stored. The translation unit 132 has stored therein a plurality of translation models corresponding to the translation model identifiers.

The speech synthesis unit 142 in any one of the speech synthesis apparatuses 14 has stored therein the speech synthesis model selection information management table shown in FIG. 15. The speech synthesis model selection information management table has stored therein one or more records of attribute values of "ID", "target language", "speaker attribute", and "speech synthesis model identifier". The "speaker attribute" here includes "gender", "age", "speaker class", and the like. It is further preferable that "speaking speed" and the like are included in the "speaker attribute". The "speech synthesis model identifier", which is information for identifying each speech synthesis model, is used to read out the speech synthesis models, for example. Here, for example, the "speech synthesis model identifier" is a name or the like of a file in which each speech synthesis model has been stored. The speech synthesis unit 142 has stored therein a plurality of speech synthesis models corresponding to the speech synthesis model identifiers.

In such a situation, the user A is trying to call the user B. The user A invoked the screen of FIG. 16, which is a screen for inputting a telephone number or the like of the called party (user B) from the first terminal apparatus 10. Then, the first terminal apparatus 10 reads out the speech translation control information (FIG. 11) stored in the first speech translation control information storage unit 100, and displays the screen of FIG. 16. Needless to say, the speaking speed, which is not displayed in the screen of FIG. 16, may be displayed. It is assumed that the user then input the language used by the called party and the called party's telephone number, and pressed the "dial" button. Note that it is assumed that in FIG. 16, the caller's telephone number "080-1111-2256" has been stored in a recording medium (not shown).

Next, a calling unit (not shown) in the first terminal apparatus 10 calls the second terminal apparatus 15. Then, conversation is started.

Next, the first speech accepting unit 101 in the first terminal apparatus 10 accepts the speech "Ohayogozaimasu" of the user A. Then, the first speech accepting unit 101 converts the speech into speech information. Next, the first speech sending unit 102 sends this speech information "Ohayogozaimasu" to the control device 11. Also, the first speech translation control information sending unit 103 sends the speech translation control information of FIG. 11 to the control device 11.

Next, the speech receiving unit 1101 in the control device 11 receives the speech information "Ohayogozaimasu" and the speech translation control information of FIG. 11 from the first terminal apparatus 10.

Then, the speech recognition requesting unit 1102 sends the received speech information and the speech translation control information to each of the two or more speech recognition apparatuses 12.

Next, the speech recognition target speech receiving unit 121 in any one of the speech recognition apparatuses 12 receives the speech information "Ohayogozaimasu" and the speech translation control information in FIG. 11 from the control device 11.

Then, each speech recognition unit 122 selects the speech recognition model by using the speech translation control information in FIG. 11. That is, the speech recognition unit 122 applies the speech translation control information in FIG. 11 to the speech recognition model selection information management table in FIG. 13, and acquires the speech recognition model identifier "JR5" corresponding to the language "Japanese", the gender "female", the age "30-39 years old", and the speaking speed "fast".

Next, the speech recognition unit 122 acquires the received speech information "Ohayogozaimasu".

Next, the speech recognition unit 122 performs speech recognition processing on the acquired speech information "Ohayogozaimasu" by using the selected speech recognition model "JR5". Then, the speech recognition unit 122 acquires "Ohayogozaimasu", which is the speech recognition result (character string), and the speech recognition score "0.83".

Next, the speech recognition unit 122 configures the speech recognition processing result "0.83: Ohayogozaimasu" from the acquired speech recognition result and speech recognition score.

Next, the speech recognition processing result sending unit 123 sends the speech recognition processing result "0.83: Ohayogozaimasu" with the speech recognition apparatus identifier "R01" to the control device 11.

Also, the other speech recognition apparatuses 12 also send the speech recognition processing results and the speech recognition apparatus identifiers to the control device 11 in the same manner as in the above-described one of the speech recognition apparatuses 12.

Next, the speech recognition processing result receiving unit 1103 in the control device 11 receives the speech recognition processing result from each of the two or more speech recognition apparatuses 12 in response to sending of the speech information. Here, it is assumed that the speech recognition processing result receiving unit 1103 has received a plurality of speech recognition processing results as shown in FIG. 17.

Next, the speech recognition result selection unit 1104 selects the speech recognition result with the highest (best) speech recognition score by using the speech recognition scores included in the two or more received speech recognition processing results (FIG. 17), and locates the selected speech recognition result on a memory. That is, the speech recognition selection unit 1104 selects the speech recognition result "Ohayogozaimasu" corresponding to the speech recognition apparatus identifier "R03", and locates the selected speech recognition result on the memory.

Next, the translation requesting unit 1105 sends the one of the speech recognition results "Ohayogozaimasu" selected by the speech recognition result selection unit 1104 and the speech translation control information (FIG. 11) to each of the two or more translation apparatuses 13.

Next, the speech recognition result receiving unit 131 in one of the translation apparatuses 13 receives the speech recognition result "Ohayogozaimasu" and the speech translation control information (FIG. 11) from the control device 11. Then, the translation unit 132 acquires the speech translation control information.

Next, the translation unit 132 selects the translation model by using the acquired speech translation control information. That is, the translation unit 132 applies the speech translation control information in FIG. 11 to the translation model selection information management table in FIG. 14, and acquires the translation model identifier "JT4" that matches the language "Japanese", the gender "female", the age "30-39 years old", and the speaker class "Y".

Next, the translation unit 132 acquires the received speech recognition result "Ohayogozaimasu".

Next, the translation unit 132 performs translation on the acquired speech recognition result "Ohayogozaimasu" by using the selected translation model "JT4". Then, the translation unit 132 acquires the translation result "Good morning." and the translation score "0.91".

Next, the translation unit 132 configures the translation processing result "0.91: Good morning." from the acquired translation result and translation score.

Next, the translation processing result sending unit 133 sends the translation processing result "0.91: Good morning." with the translation apparatus identifier "T01" to the control device 11.

Also, the other translation apparatuses 12 also send the translation processing results and the translation apparatus identifiers to the control device 11 in the same manner as in the above-described one of the translation apparatuses 12.

Next, the translation processing result receiving unit 1106 in the control device 11 receives the translation processing result from each of the two or more translation apparatuses 13 in response to sending of the speech recognition result and the like. Here, it is assumed that the translation processing result receiving unit 1106 has received a plurality of translation processing results as shown in FIG. 18.

Next, the translation result selection unit 1107 selects the translation result with the highest (best) translation score by using the translation scores included in the two or more received translation processing results, and locates the selected translation result on a memory. That is, the translation result selection unit 1107 selects the translation result "1.00: Good morning." of the translation apparatus identifier "T02", and locates the selected translation result in the memory.

Next, the speech synthesis requesting unit 1108 in the control device 11 sends the translation result "Good morning." selected by the translation result selection unit 1107 to each of the two or more speech synthesis apparatuses 14.

Next, the translation result receiving unit 141 in one of the speech synthesis apparatuses 14 receives the translation result and the speech translation control information from the control device 11. Then, the speech synthesis unit 142 acquires the received speech translation control information.

Next, the speech synthesis unit 142 selects the speech synthesis model by using the acquired speech translation control information. That is, the speech synthesis unit 142 applies the speech translation control information in FIG. 11 to the speech synthesis model selection information management table in FIG. 15, and acquires the speech synthesis model identifier "JC9" that matches the target language "English", the gender "female", the age "30-39 years old", and the speaking class "Y".

Next, the speech synthesis unit 142 acquires the received translation result "Good morning.".

Next, the speech synthesis unit 142 performs speech synthesis processing on the acquired translation result "Good morning" by using the selected speech synthesis model "JC9". Then, the speech synthesis unit 142 acquires the speech synthesis result (generally, speech information) and the speech synthesis score "0.87".

Next, the speech synthesis unit 142 configures the speech synthesis processing result from the acquired speech synthesis result and speech synthesis score.

Next, the speech synthesis processing result sending unit 143 sends the speech synthesis result with the speech synthesis apparatus identifier "J01" to the control device 11. Here, the speech synthesis result is, for example, a speech information file.

Also, the other speech synthesis apparatuses 14 also send the speech synthesis processing results and the speech synthesis apparatus identifiers to the control device 11 in the same manner as in the above-described one of the speech synthesis apparatuses 14.

Next, the speech synthesis processing result receiving unit 1109 in the control device 11 receives the speech synthesis processing result from each of the two or more speech synthesis apparatuses 14 in response to sending of the translation result. Here, it is assumed that the speech synthesis processing result receiving unit 1109 has received a plurality of speech synthesis processing results as shown in FIG. 19.

Next, the speech synthesis result selection unit 1110 selects the speech synthesis result with the highest (best) speech synthesis score by using the speech synthesis scores included in the two or more received speech synthesis processing results, and locates the selected speech synthesis result on a memory. That is, the speech synthesis result selection unit 1110 selects the speech synthesis result corresponding to the speech synthesis apparatus identifier "J01".

Next, the speech synthesis result sending unit 1111 sends the speech synthesis result selected by the speech synthesis result selection unit 1110 to the second terminal apparatus 15 used by the user B.

Next, the second speech receiving unit 154 in the second terminal apparatus 15 receives the speech synthesis result "Good morning". Then, the second speech output unit 155 output the speech "Good morning".

With the above-described procedure, "Ohayogozaimasu" uttered by the user A is converted into the speech "Good morning" before reaching the second terminal apparatus 15, and the speech "Good morning" is output to the second terminal apparatus 15.

Also, the speech "Good morning" uttered by the user B of the second terminal apparatus 15 in response to "Good morning" is converted into "Ohayo" with the same processing as described above, and the speech "Ohayo" is output to the first terminal apparatus 10.

As described above, with the present embodiment, appropriate processing results can be selected from among processing results (speech recognition results, translation results, and speech synthesis results) from server groups each undertaking the same role (two or more speech recognition apparatuses 12, two or more translation apparatuses 13, and two or more speech synthesis apparatuses 14).

Also, with the present embodiment, appropriate models that match the speech translation control information including speaker attributes can be selected in each processing of speech recognition, translation, and speech synthesis. As a result, a network-type speech translation system with high accuracy, or which inherits speaker's attributes, can be provided.

In the present embodiment, a processing result is selected from among processing results from a plurality of speech recognition apparatuses, a processing result is selected from processing results from a plurality of translation apparatuses, and a processing result is selected from among processing results from a plurality of speech synthesis apparatuses. However, a processing result may be selected only from processing results from the plurality of speech recognition apparatuses, while the translation apparatus and the speech synthesis apparatus may be fixed. In this case, the speech translation system includes a control device, two or more speech recognition apparatuses, a translation apparatus, and a speech synthesis apparatus, wherein the control device includes: a speech recognition processing result receiving unit that receives a speech recognition processing result including a speech recognition result for the speech information and a speech recognition score that indicates a probability of speech recognition processing from each of the two or more speech recognition apparatuses; a speech recognition result selection unit that selects a speech recognition apparatus that is most probable by using the speech recognition scores included in the two or more speech recognition processing results received by the speech recognition processing result receiving unit; and a translation requesting unit that sends the speech recognition result selected by the speech recognition result selection unit to the translation apparatus, each speech recognition apparatus includes: a speech receiving unit that receives speech information directly or indirectly from a first terminal apparatus that accepts speech of a first user; a speech recognition unit that performs speech recognition processing on the speech information received by the speech receiving unit, and acquires a speech recognition processing result including a speech recognition result and a speech recognition score that indicates a probability of speech recognition processing; and a speech recognition processing result sending unit that sends the speech recognition processing result acquired by the speech recognition unit to the control device, the translation apparatus includes: a speech recognition result receiving unit that receive the speech recognition result from the control device; a translation unit that performs translation on the speech recognition result received by the speech recognition result receiving unit into a target language, and acquires a translation result; and a translation processing result sending unit that sends the translation result acquired by the translation unit directly or indirectly to the speech synthesis apparatus, the speech synthesis apparatus includes: a translation result receiving unit that receives the translation result; a speech synthesis unit that performs speech synthesis processing on the translation result, and acquires a speech synthesis result; and a speech synthesis processing result sending unit that sends the speech synthesis results directly or indirectly to the second terminal apparatus used by the second user.

Furthermore, in the present embodiment, a processing result may be selected only from processing results from the plurality of translation apparatuses, while the speech recognition apparatus and the speech synthesis apparatus may be fixed. In this case, the speech translation system includes a control device, a speech recognition apparatus, two or more translation apparatuses, and a speech synthesis apparatus, wherein the control device includes: a translation processing result receiving unit that receives a translation processing result including a result of translation performed on a speech recognition result into a target language and a translation score that indicates a probability of translation processing from each of the two or more translation apparatuses; a translation result selection unit that selects a translation result that is most probable by using the translation scores included in two or more translation processing results received by the translation processing result receiving unit; and a speech synthesis requesting unit that sends the translation result selected by the translation result selection unit directly or indirectly to the speech synthesis apparatus, the speech recognition apparatus includes: a speech receiving unit that receives speech information directly or indirectly from a first terminal apparatus that accepts speech of a first user; a speech recognition unit that performs speech recognition processing on the speech information received by the speech receiving unit, and acquires a speech recognition processing result including a speech recognition result; and a speech recognition processing result sending unit that sends the speech recognition processing result acquired by the speech recognition unit directly or indirectly to the translation apparatuses, each translation apparatus includes: a speech recognition result receiving unit that receives the speech recognition result; a translation unit that performs translation on the speech recognition result received by the speech recognition result receiving unit into a target language, and acquires a translation processing result including a translation result and a translation score that indicates a probability of translation processing; and a translation processing result sending unit that sends the translation processing result acquired by the translation unit to the control device, the speech synthesis apparatus includes: a translation result receiving unit that receives the translation result from the control device; a speech synthesis unit that performs speech synthesis processing on the translation result, and acquires a speech synthesis result; and a speech synthesis processing result sending unit that sends the speech synthesis result directly or indirectly to the second terminal apparatus used by the second user.

Furthermore, in the present embodiment, a processing result may be selected only from among processing results from the plurality of speech synthesis apparatuses, while the speech recognition apparatus and the translation apparatus may be fixed. In this case, the speech translation system includes a control device, a speech recognition apparatus, and two or more speech synthesis apparatuses, wherein the control device includes: a speech synthesis processing result receiving unit that receives a speech synthesis processing result including a speech synthesis result and a speech synthesis score that indicates a probability of speech synthesis processing from each of the two or more speech synthesis apparatuses; a speech synthesis result selection unit that selects a speech synthesis result that is most probable by using the speech synthesis scores included in two or more speech synthesis processing results received by the speech synthesis processing result receiving unit; and a speech synthesis result sending unit that sends the speech synthesis result selected by the speech synthesis result selection unit to a second terminal apparatus used by a second user, the speech recognition apparatus includes: a speech receiving unit that receives speech information directly or indirectly from a first terminal apparatus that accepts speech of a first user; a speech recognition unit that performs speech recognition processing on the speech information received by the speech receiving unit, and acquires a speech recognition result; and a speech recognition processing result sending unit that sends the speech recognition result acquired by the speech recognition unit directly or indirectly to the translation apparatus, the translation apparatus comprises: a speech recognition result receiving unit that receives the speech recognition result; a translation unit that performs translation on the speech recognition result received by the speech recognition result receiving unit into a target language, and acquires a translation result; and a translation processing result sending unit that sends the translation result acquired by the translation unit directly or indirectly to the speech synthesis apparatuses, each speech synthesis apparatus includes: a translation result receiving unit that receives the translation result; a speech synthesis unit that performs speech synthesis processing on the translation result, and acquires a speech synthesis processing result including a speech synthesis result and a speech synthesis score that indicates a probability of speech synthesis processing; and a speech synthesis processing result sending unit that sends the speech synthesis processing result to the control device.

Furthermore, in the present embodiment, only one of the speech recognition apparatus designated by a user, or only one of the translation apparatuses designated by the user, or only one of the speech synthesis apparatuses designated by the user may be used. For example, given the speech translation control information in FIG. 20, where the speech recognition apparatus is designated, it is preferable that the control device 11 sends the speech information only to, and requests speech recognition processing only from the speech recognition apparatus 12 identified as "186.221.1.27". Note that a similar process is performed in the case where the translation apparatus or the speech synthesis apparatus is designated in the speech translation control information.

Furthermore, in the present embodiment, the speech recognition processing result sending unit 123 in each of the one or more speech recognition apparatus 12 may add the speech recognition score in the speech recognition processing result to the speech translation control information, and send the speech recognition result and the speech translation control information that contains the speech recognition score to the control device 11. That is, the speech recognition processing result may be information including the speech recognition result and the speech translation control information that contains the speech recognition score. Then, the speech recognition result selection unit 1104 in the control device 11 selects the speech recognition results by using the speech recognition score contained in the speech translation control information. The same applies to the other embodiments.

Furthermore, in the present embodiment, the translation processing result sending unit 133 in each of the one or more translation apparatuses 13 may add the translation score in the translation processing result to the speech translation control information, and send the translation result and the speech translation control information that contains the translation score to the control device 11. That is, the translation processing result may be information including the translation result and the speech translation control information that contains the translation score. Then, the translation result selection unit 1107 in the control device 11 selects the translation result by using the translation score contained in the speech translation control information. The same applies to the other embodiments.

Furthermore, in the present embodiment, the speech synthesis processing result sending unit 143 in each of the one or more speech synthesis apparatuses 14 may add the speech synthesis score in the speech synthesis processing result to the speech translation control information, and send the speech synthesis result and the speech translation control information that contains the speech synthesis score to the control device 11. That is, the speech synthesis processing result may be information including the speech synthesis result and the speech translation control information that contains the speech synthesis score. Then, the speech synthesis result selection unit 1110 in the control device 11 selects the speech synthesis result by using the speech synthesis score contained in the speech translation control information. The same applies to the other embodiments.

Furthermore, the processing in the present embodiment may also be realized by software. Such software may further be distributed by software download or the like. In addition, such software may be recorded on a recording medium such as a CD-ROM and distributed. Note that this applies to other embodiments of the present specification as well. Software that realizes the control device 11 in the present embodiment may be a program as described below. That is, for example, this program causes a computer to function as: a speech receiving unit that receives speech information from a first terminal apparatus that accepts speech of a first user; a speech recognition requesting unit that sends the speech information to two or more speech recognition apparatuses respectively; a speech recognition processing result receiving unit that receives, in response to sending of the speech information, two or more speech recognition processing results each including a speech recognition result for the speech information and a speech recognition score that indicates a probability of speech recognition processing from the two or more speech recognition apparatuses; a speech recognition processing result receiving unit that receives, in response to sending of the speech information, two or more speech recognition processing results each including a speech recognition result for the speech information and a speech recognition score that indicates a probability of speech recognition processing from the two or more speech recognition apparatuses; a translation requesting unit that sends the speech recognition result selected by the speech recognition result selection unit to two or more translation apparatuses respectively; a translation processing result receiving unit that receives, in response to sending of the speech recognition result, a translation processing result including a result of translation performed on the speech recognition result into a target language and a translation score that indicates a probability of translation processing from each of the two or more translation apparatuses; a translation result selection unit that selects a translation result that is most probable by using the translation scores included in two or more translation processing results received by the translation processing result receiving unit; a speech synthesis requesting unit that sends the translation result selected by the translation result selection unit to two or more speech synthesis apparatuses respectively; a speech synthesis processing result receiving unit that receives, in response to sending of the translation result, a speech synthesis processing result including a speech synthesis result for the translation result and a speech synthesis score that indicates a probability of speech synthesis processing from each of the two or more speech synthesis apparatuses; a speech synthesis result selection unit that selects a speech synthesis result that is most probable by using the speech synthesis scores included in two or more speech synthesis processing results received by the speech synthesis processing result receiving unit; and a speech synthesis result sending unit that sends the speech synthesis result selected by the speech synthesis result selection unit to a second terminal apparatus used by a second user.

Embodiment 2

In the present embodiment, a speech translation system in which in a set of conversation between users, the same process as described in Embodiment 1 is performed until a predetermined condition is satisfied, and after the predetermined condition is satisfied, the speech recognition apparatus, the translation apparatus, or the speech synthesis apparatus is fixed to perform speech translation processing will be described. That is, in the speech translation system in the present embodiment, once the speech recognition apparatus, the translation apparatus, or the speech synthesis apparatus with a high score is determined, a processing request is given not to all the apparatuses but to one specific apparatus, which is the difference from the speech translation system in Embodiment 1.

The conceptual diagram of the speech translation system in Embodiment 2 is the same as FIG. 1. The speech translation system described in Embodiment 1 and the speech translation system in Embodiment 2 have different control devices. The speech translation system in Embodiment 2 includes a first terminal apparatus 10, a control device 21, speech recognition apparatuses 12, translation apparatuses 13, speech synthesis apparatuses 14, and a second terminal apparatus 15.

FIG. 21 is a block diagram of the control device 21 in the present embodiment. The control device 21 includes a speech translation control information receiving unit 1100, a speech receiving unit 1101, a speech recognition requesting unit 2102, a speech recognition processing result receiving unit 1103, a speech recognition result selection unit 1104, a translation requesting unit 2105, a translation processing result receiving unit 1106, a translation result selection unit 1107, a speech synthesis requesting unit 2108, a speech synthesis processing result receiving unit 1109, a speech synthesis result selection unit 1110, a speech synthesis result sending unit 1111, a speech recognition apparatus selection unit 2112, a translation apparatus selection unit 2113, and a speech synthesis apparatus selection unit 2114.

The speech recognition requesting unit 2102 sends speech information to each of the two or more speech recognition apparatuses 12. After the speech recognition apparatus selection unit 2112 selects a speech recognition apparatus 12, the speech recognition requesting unit 2102 sends the speech information only to the selected speech recognition apparatus 12. The speech recognition requesting unit 2102 may send the speech translation control information with the speech information.

The translation requesting unit 2105 sends the speech recognition result selected by the speech recognition result selection unit 1104 to each of the two or more translation apparatuses 13. After the translation apparatus selection unit 2113 selects a translation apparatus 13, the translation requesting unit 2105 sends the speech recognition result only to the selected translation apparatus 13. The translation requesting unit 2105 may send the speech translation control information with the speech recognition result.

The speech synthesis requesting unit 2108 sends the translation result selected by the translation result selection unit 1107 to each of the two or more speech synthesis apparatuses 14. After the speech synthesis apparatus selection unit 2114 selects a speech synthesis apparatus 14, the speech synthesis requesting unit 2108 sends the translation result only to the selected speech synthesis apparatus 14. The speech synthesis requesting unit 2108 may send the speech translation control information with the translation result.

The speech recognition apparatus selection unit 2112 selects, with one or more times of processing for selecting a speech recognition result in the speech recognition result selection unit 1104, the speech recognition apparatus 12 to perform subsequent sessions of speech recognition processing from among the two or more speech recognition apparatuses 12. The speech recognition apparatus selection unit 2112 holds a speech recognition apparatus selection condition which is a condition for selecting the speech recognition apparatus 12. If the speech recognition apparatus selection condition is satisfied, the speech recognition apparatus selection unit 2112 selects a speech recognition apparatus 12 to perform speech recognition processing from among the two or more speech recognition apparatuses 12. The speech recognition apparatus selection condition is a condition using past speech recognition scores. For example, the speech recognition apparatus selection condition is the condition that the speech recognition apparatus 12 having the best speech recognition score for the first session is selected (exemplary notation of the speech recognition apparatus selection condition "condition: number of time=1, max-score (speech recognition apparatus)"). Further, for example, the speech recognition apparatus selection condition is the condition that in the fifth or subsequent sessions, the speech recognition apparatus 12 of which the average value of the speech recognition scores is 0.85 or higher and having the highest average value of the speech recognition scores is selected (exemplary notation of the speech recognition apparatus selection condition "condition: number of time=5 or larger, max-score (average-score>=0.85)"). Also, for example, the speech recognition apparatus selection condition is the condition that the speech recognition apparatus 12 of which the speech recognition score exceeds 0.95 at least once is selected. Note that the speech recognition apparatus selection condition may be any condition for selecting an appropriate speech recognition apparatus 12 to perform speech recognition.

The translation apparatus selection unit 2113 selects, with one or more times of processing for selecting a translation result in the translation result selection unit 1107, the translation apparatus 13 to perform the subsequent sessions of translation processing from among the two or more translation apparatuses 13. The translation apparatus selection unit 2113 holds a translation apparatus selection condition which is a condition for selecting the translation apparatus 13. If the translation apparatus selection condition is satisfied, the translation apparatus selection unit 2113 selects a translation apparatus 13 to perform translation processing from among the two or more translation apparatuses 13. The translation apparatus selection condition is a condition using past translation scores. For example, the translation apparatus selection condition is the condition that the translation apparatus 13 having the best translation score for the first session is selected (exemplary notation of the translation apparatus selection condition "condition: number of time=1, max-score (translation apparatus)"). Further, for example, the translation apparatus selection condition is the condition that in the fifth or subsequent sessions, the translation apparatus 13 of which the average value of the translation scores is 0.85 or higher and having the highest average value of the translation scores is selected (exemplary notation of the speech recognition apparatus selection condition "condition: number of time=5 or larger, max-score (average-score>=0.85)"). Also, for example, the translation apparatus selection condition is the condition that the translation apparatus 13 of which the translation score exceeds 0.95 at least once is selected. Note that the translation apparatus selection condition may be any condition for selecting an appropriate translation apparatus 13 to perform translation.

The speech synthesis apparatus selection unit 2114 selects, with one or more times of processing for selecting a speech synthesis result in the speech synthesis result selection unit 1110, the speech synthesis apparatus 14 to perform subsequent sessions of speech synthesis processing from among the two or more speech synthesis apparatuses 14. The speech synthesis apparatus selection unit 2114 holds a speech synthesis apparatus selection condition which is a condition for selecting the speech synthesis apparatus 14. If the speech synthesis apparatus selection condition is satisfied, the speech synthesis apparatus selection unit 2114 selects a speech synthesis apparatus 14 to perform speech synthesis processing from among the two or more speech synthesis apparatuses 14. The speech synthesis apparatus selection condition is a condition using past speech synthesis scores. For example, the speech synthesis apparatus selection condition is the condition that the speech synthesis apparatus 14 having the best speech synthesis score for the first session is selected (exemplary notation of the speech synthesis apparatus selection condition "condition: number of time=1, max-score (speech synthesis apparatus)"). Further, for example, the speech synthesis apparatus selection condition is the condition that in the fifth or subsequent sessions, the speech synthesis apparatus 14 of which the average value of the speech synthesis scores is 0.85 or higher and having the highest average value of the speech synthesis scores is selected (exemplary notation of the speech synthesis apparatus selection condition "condition: number of time=5 or larger, max-score (average-score>=0.85)"). Also, for example, the speech synthesis apparatus selection condition is the condition that the speech synthesis apparatus 14 of which the speech synthesis score exceeds 0.95 at least once is selected. Note that the speech synthesis apparatus selection condition may be any condition for selecting an appropriate speech synthesis apparatus 14 to perform speech synthesis.

The speech recognition requesting unit 2102, the translation requesting unit 2105, and the speech synthesis requesting unit 2108 are generally realized by wireless or wired communication means, but may also be realized by broadcasting means.

The speech recognition apparatus selection unit 2112, the translation apparatus selection unit 2113, and the speech synthesis apparatus selection unit 2114 can be generally realized by an MPU, memory or the like. The processing procedures of the speech recognition apparatus selection unit 2112 and so on are generally realized by software, and the software therefor is recorded in a recording media such as a ROM. However, it may also be realized by hardware (dedicated circuit).

Next, an operation of the control device 21 in the speech translation system is described using the flowchart in FIG. 22 and FIG. 23. Note that description of the same steps in the flowchart in FIG. 22 and FIG. 23 as those in the flowchart in FIG. 7 is omitted.

(Step S2201) The speech recognition requesting unit 2102 checks whether or not one of the speech recognition apparatuses 12 from which speech recognition is requested has already been determined. Note that if the one of the speech recognition apparatuses 12 has already been determined, for example, the speech recognition apparatus identifier thereof has been stored in a predetermined buffer. If the one of the speech recognition apparatuses 12 has already been determined, the procedure proceeds to step S2202, and if not, the procedure proceeds to step S702. Generally, the one of the speech recognition apparatuses 12 is determined for every user of the first terminal apparatus 10, and for every conversation of the user of the first terminal apparatus 10.

(Step S2202) The speech recognition requesting unit 2102 sends speech information to the one of the speech recognition apparatuses 12. Note that the speech recognition requesting unit 2102 generally reads out the speech recognition apparatus identifier from the buffer, and sends the speech information to the one of the speech recognition apparatuses 12 by using the speech recognition apparatus identifier.

(Step S2203) The speech recognition apparatus selection unit 2112 temporarily accumulates the speech recognition scores of the speech recognition apparatuses 12 received by the speech recognition processing result receiving unit 1103 in association with the speech recognition apparatus identifiers in a recording medium such as a buffer.

(Step S2204) The speech recognition apparatus selection unit 2112 performs processing for selecting the speech recognition apparatus 12. This speech recognition apparatus selection processing will be described using the flowchart in FIG. 24.

(Step S2205) The translation requesting unit 2105 checks whether or not one of the translation apparatuses 13 from which translation is requested has already been determined. Note that if the one of the translation apparatuses 13 has already been determined, for example, the translation apparatus identifier thereof has been stored in a predetermined buffer. If the one of the translation apparatuses 13 has already been determined, the procedure proceeds to step S2206, and if not, the procedure proceeds to step S707. Note that the one of the translation apparatuses 13 is generally determined for every user of the first terminal apparatus 10, and for every conversation of the user of the first terminal apparatus 10.

(Step S2206) The translation requesting unit 2105 sends a speech recognition result to the one of the translation apparatuses 13. Note that the translation requesting unit 2105 generally reads out the translation apparatus identifier from the buffer, and sends the speech recognition result to the one of the translation apparatuses 13 by using the translation apparatus identifier.

(Step S2207) The translation apparatus selection unit 2113 temporarily accumulates the translation scores of the translation apparatuses 13 received by the translation processing result receiving unit 1106 in association with the translation apparatus identifiers in a recording medium such as a buffer.

(Step S2208) The translation apparatus selection unit 2113 performs processing for selecting the translation apparatus 13. This translation apparatus selection processing will be described using the flowchart in FIG. 24.

(Step S2209) The speech synthesis requesting unit 2108 checks whether or not one of the speech synthesis apparatuses 14 from which speech synthesis is requested has already been determined. Note that if the one of the speech synthesis apparatuses 14 has already been determined, for example, the speech synthesis apparatus identifier thereof has been stored in a predetermined buffer. If the one of the speech synthesis apparatuses 14 has already been determined, the procedure proceeds to step S2210, and if not, the procedure proceeds to step S712. Note that the one of the speech synthesis apparatuses 14 is generally determined for every user of the first terminal apparatus 10, and for every conversation of the user of the first terminal apparatus 10.

(Step S2210) The speech synthesis requesting unit 2108 sends a translation result to the one of the speech synthesis apparatuses 14. Note that the speech synthesis requesting unit 2108 generally reads out the speech synthesis apparatus identifier therefor from the buffer, and sends the translation result to the one of the speech synthesis apparatuses 14 by using the speech synthesis apparatus identifier.

(Step S2211) The speech synthesis apparatus selection unit 2114 temporarily accumulates the speech synthesis scores of the speech synthesis apparatuses 14 received by the speech synthesis processing result receiving unit 1109 in association with the speech synthesis apparatus identifiers in a recording medium such as a buffer.

(Step S2212) The speech synthesis apparatus selection unit 2114 performs processing for selecting the speech synthesis apparatus 14. This speech synthesis apparatus selection processing is described using the flowchart in FIG. 24. Note that the translation apparatus selection processing, the speech recognition apparatus selection processing, and the speech synthesis apparatus selection processing, which are similar to one another, will be described all together.

Note that in the flowchart in FIG. 22 and FIG. 23, the processing ends due to powering off or interruption for aborting the processing.

Next, the speech recognition apparatus selection processing, the translation apparatus selection processing, and the speech synthesis apparatus selection processing are described using the flowchart in FIG. 24. Hereinafter, the case of selecting the speech recognition apparatus is described.

(Step S2401) The speech recognition apparatus selection unit 2112 acquires the number of times of processing performed so far. The number of times of processing performed so far is, for example, the number of times of speech recognition processing performed on speech information of the user A during one session of conversation between the user A and the user B.

(Step S2402) The speech recognition apparatus selection unit 2112 substitutes 1 for the counter i.

(Step S2403) The speech recognition apparatus selection unit 2112 determines whether or not the ith condition exists in the conditions that have been stored. If the ith condition exists, the procedure proceeds to step S2404, and if not, the procedure proceeds to step S2413. Note that the conditions refer to, for example, the speech recognition apparatus selection conditions.

(Step S2404) The speech recognition apparatus selection unit 2112 reads out the ith condition.

(Step S2405) The speech recognition apparatus selection unit 2112 substitutes 1 for the counter j.

(Step S2406) The speech recognition apparatus selection unit 2112 determines whether or not the jth speech recognition apparatus 12 to perform speech recognition processing. If the jth speech recognition apparatus 12 exists, the procedure proceeds to step S2407, and if not, the procedure proceeds to step S2412.

(Step S2407) The speech recognition apparatus selection unit 2112 reads out the scores for processing performed so far by the jth speech recognition apparatus 12.

(Step S2408) The speech recognition apparatus selection unit 2112 applies necessary information among the scores of the jth speech recognition apparatus 12 read out at step S2407 and the number of times of processing performed so far acquired at step S2401 to the ith condition. Note that the ith condition here may not refer to all of the ith condition. For example, if the highest score in all apparatuses is included in the condition, this determination is performed at step S2413.

(Step S2409) The speech recognition apparatus selection unit 2112 determines whether or not the jth speech recognition apparatus 12 matches the ith condition. If the jth speech recognition apparatus 12 matches the ith condition, the procedure proceeds to step S2410, and if not, the procedure jumps to step S2411.

(Step S2410) The speech recognition apparatus selection unit 2112 temporarily accumulates the speech recognition apparatus identifier, the scores, and the like of the jth speech recognition apparatus 12.

(Step S2411) The speech recognition apparatus selection unit 2112 increments the counter j by 1.

(Step S2412) The speech recognition apparatus selection unit 2112 increments the counter i by 1.

(Step S2413) The speech recognition apparatus selection unit 2112 determines the best speech recognition apparatus 12 that best matches the condition ultimately from among the speech recognition apparatuses 12 identified by the speech recognition apparatus identifiers accumulated at step S2410. For example, the speech recognition apparatus selection unit 2112 uses the applied condition, and selects the speech recognition apparatus with the best conditions relative to the scores (e.g., average value of scores, variance of scores, recent score values, etc.) adopted in the condition.

(Step S2414) The speech recognition apparatus selection unit 2112 accumulates, in the buffer, the speech recognition apparatus identifier of the speech recognition apparatus 12 determined at step S2413. Then, the procedure returns to the precedent process.

Note that in the flowchart in FIG. 24, the number of stored conditions may be plural, but needless to say, the number may also be one.

Hereinafter, a specific operation of the speech translation system of the present embodiment will be described. The conceptual diagram of the speech translation system is the same as FIG. 1.

Now, the speech recognition apparatus selection unit 2112 has stored therein the speech recognition apparatus selection condition "condition: number of time=5 or larger, max-score (average-score>=0.85)". This speech recognition apparatus selection condition is the condition that in the fifth and subsequent sessions, the speech recognition apparatus 12 of which the average value of the speech recognition scores is 0.85 or higher and having the highest average value of the speech recognition scores and is selected.

The translation apparatus selection unit 2113 has stored therein "condition: number of time=1, max-score (translation apparatus)". This translation apparatus selection condition is the condition that the translation apparatus 13 having the best translation score for the first session is selected.

The speech synthesis apparatus selection unit 2114 has stored therein "condition: if (speech synthesis score>0.95) [select (speech synthesis apparatus)]". This speech synthesis apparatus selection condition is the condition that the speech synthesis apparatus 14 of which the speech synthesis score exceeds 0.95 at least once is selected.

In such a situation, the user A of the first terminal apparatus 10 and the user B of the second terminal apparatus 15 have a conversation. Similarly to the specific example of Embodiment 1, the user A of the first terminal apparatus 10 is a 37-year-old female who speaks Japanese, and is a native Japanese speaker. The user B of the second terminal apparatus 15 is a 38-year-old male who speaks English, and is a native English speaker.

Also, as in the specific example in Embodiment 1, the user A is trying to call the user B. Then, a calling unit (not shown) in the first terminal apparatus 10 calls the second terminal apparatus 15. Then, conversation is started.

Next, the first speech accepting unit 101 in the first terminal apparatus 10 accepts the speech "Ohayogozaimasu" of the user A. Then, the first speech accepting unit 101 converts the speech into speech information. Next, the first speech sending unit 102 sends this speech information "Ohayogozaimasu" to the control device 11. Also, the first speech translation control information sending unit 103 sends the speech translation control information in FIG. 11 to the control device 11.

Next, the speech receiving unit 1101 in the control device 11 receives the speech information "Ohayogozaimasu" and the speech translation control information in FIG. 11 from the first terminal apparatus 10.

Next, the speech recognition requesting unit 2102 determines that one of the speech recognition apparatuses 12 from which speech recognition is requested has not been determined yet.

Then, the speech recognition requesting unit 1102 sends the received speech information and speech translation control information to each of the two or more speech recognition apparatuses 12.

Next, the speech recognition target speech receiving unit 121 in any one of the speech recognition apparatuses 12 receives the speech information "Ohayogozaimasu" and the speech translation control information in FIG. 11 from the control device 11.

Then, each speech recognition unit 122 selects the speech recognition model by using the speech translation control information in FIG. 11. That is, the speech recognition unit 122 applies the speech translation control information in FIG. 11 to the speech recognition model selection information management table in FIG. 13, and acquires the speech recognition model identifier "JR5" that matches the language "Japanese", the gender "female", the age "30-39 years old", and the speaking speed "fast".

Next, the speech recognition unit 122 acquires the received speech information "Ohayogozaimasu".

Next, the speech recognition unit 122 performs speech recognition processing on the acquired speech information "Ohayogozaimasu" by using the selected speech recognition model "JR5". Then, the speech recognition unit 122 acquires "Ohayogozaimasu" which is the speech recognition result (a character string) and the speech recognition score "0.83".

Next, the speech recognition unit 122 configures the speech recognition processing result "0.83: Ohayogozaimasu" from the acquired speech recognition result and speech recognition score.

Next, the speech recognition processing result sending unit 123 sends the speech recognition processing result "0.83: Ohayogozaimasu" with the speech recognition apparatus identifier "R01" to the control device 11.

Also, the other speech recognition apparatuses 12 also send the speech recognition processing results and the speech recognition apparatus identifiers to the control device 11 in the same manner as the above-described one of the speech recognition apparatuses 12.

Next, the speech recognition processing result receiving unit 1103 in the control device 11 receives the speech recognition processing result from each of the two or more speech recognition apparatuses 12 in response to sending of the speech information. Here, it is assumed that the speech recognition processing result receiving unit 1103 has received a plurality of speech recognition processing results as shown in FIG. 17.

Next, the speech recognition result selection unit 1104 selects the speech recognition result with the highest (best) speech recognition score by using the speech recognition scores included in the two or more received speech recognition processing results (FIG. 17), and locates the selected speech recognition result on a memory. That is, the speech recognition result selection unit 1104 selects the speech recognition result "Ohayogozaimasu" corresponding to the speech recognition apparatus identifier "R03", and locates the selected speech recognition result on the memory.

Next, the speech recognition requesting unit 2102 determines that one of the speech recognition apparatuses 12 from which speech recognition is requested has not been determined yet.

Then, the speech recognition apparatus selection unit 2112 temporarily accumulates the speech recognition scores of the speech recognition apparatuses 12 received by the speech recognition processing result receiving unit 1103 in association with the speech recognition apparatus identifiers in a recording medium such as a buffer.

Next, the speech recognition apparatus selection unit 2112 attempts to perform processing for selecting the speech recognition apparatus 12, but here, no speech recognition apparatus 12 satisfies the above-described speech recognition apparatus selection condition.

Next, the translation requesting unit 2105 determines that one of the translation apparatuses 13 from which translation is requested has not determined yet.

Next, the translation requesting unit 1105 sends the one of the speech recognition results "Ohayogozaimasu" selected by the speech recognition result selection unit 1104 and the speech translation control information (FIG. 11) to each of the two or more translation apparatuses 13.

Next, the speech recognition result receiving unit 131 in one of the translation apparatuses 13 receives the speech recognition result "Ohayogozaimasu" and the speech translation control information (FIG. 11) from the control device 11. Then, the translation unit 132 acquires the speech translation control information.

Next, the translation unit 132 selects the translation model by using the acquired speech translation control information. That is, the translation unit 132 applies the speech translation control information in FIG. 11 to the translation model selection information management table in FIG. 14, and acquires the translation model identifier "JT4" that matches the language "Japanese", the gender "female", the age "30-39 years old", and the speaker class "Y".

Next, the translation unit 132 acquires the received speech recognition result "Ohayogozaimasu".

Next, the translation unit 132 performs translation on the acquired speech recognition result "Ohayogozaimasu" by using the selected translation model "JT4". Then, the translation unit 132 acquires the translation result "Good morning." and the translation score "0.91".

Next, the translation unit 132 configures the translation processing result "0.91: Good morning." from the acquired translation result and translation score.

Next, the translation processing result sending unit 133 sends the translation processing result "0.91: Good morning." with the translation apparatus identifier "T01" to the control device 11.

Also, the other translation apparatuses 12 also send the translation processing results and the translation apparatus identifiers to the control device 11 in the same manner as the above-described one of the translation apparatuses 13.

Next, the translation processing result receiving unit 1106 in the control device 11 receives the translation processing result from each of the two or more translation apparatuses 13 in response to sending of the speech recognition result and the like. Here, it is assumed that the translation processing result receiving unit 1106 has received a plurality of translation processing results as shown in FIG. 18.

Next, the translation result selection unit 1107 selects the translation result with the highest (best) translation score by using the translation scores included in the two or more received translation processing results, and locates the selected translation result on the memory. That is, the translation result selection unit 1107 selects the translation result "1.00: Good morning." of the translation apparatus identifier "T02", and locates the selected translation result on the memory.

Next, the translation requesting unit 2105 determines that one of the translation apparatuses 13 from which translation is requested has not been determined yet.

Then, the translation apparatus selection unit 2113 temporarily accumulates the translation scores of the translation apparatuses 13 received by the translation processing result receiving unit 1106 in association with the translation apparatus identifiers in a recording medium such as a buffer. Here, the translation apparatus selection unit 2113 temporarily accumulates "(T01, 0.91) (T02, 1.00) (T03, 0.78) . . . " in a recording medium such as a buffer.

Next, the translation apparatus selection unit 2113 performs processing for selecting the translation apparatus 13. That is, the translation apparatus selection unit 2113 reads out the stored translation apparatus selection condition "condition: number of time=1, max-score (translation apparatus)". Then, the translation apparatus selection unit 2113 applies "(T01, 0.91) (T02, 1.00) (T03, 0.78) . . . " to the translation apparatus selection condition "condition: number of time=1, max-score (translation apparatus)". The translation apparatus selection unit 2113 then selects (T02, 1.00), which has the best translation score. The translation apparatus selection unit 2113 then accumulates the translation apparatus identifier (T02) in the buffer. Subsequently, the translation requesting unit 2105 requests translation only from the translation apparatus 13 identified by the translation apparatus identifier (T02). The translation request refers to sending of a speech recognition result and the like.

Next, the speech synthesis requesting unit 2108 determines that one of the speech synthesis apparatuses 14 from which speech synthesis is requested has not been determined yet.

Next, the speech synthesis requesting unit 1108 in the control device 11 sends the translation result "Good morning." selected by the translation result selection unit 1107 to each of the two or more speech synthesis apparatuses 14.

Next, the translation result receiving unit 141 in one of the speech synthesis apparatuses 14 receives the translation result and the speech translation control information from the control device 11. Then, the speech synthesis unit 142 acquires the received speech translation control information.

Next, the speech synthesis unit 142 selects the speech synthesis model by using the acquired speech translation control information. That is, the speech synthesis unit 142 applies the speech translation control information in FIG. 11 to the speech synthesis model selection information management table in FIG. 15, and acquires the speech synthesis model identifier "JC9" that matches the target language "English", the gender "female", the age "30-39 years old", and the speaking class "Y".

Next, the speech synthesis unit 142 acquires the received translation result "Good morning.".

Next, the speech synthesis unit 142 performs speech synthesis processing on the acquired translation result "Good morning" by using the selected speech synthesis model "JC9". Then, the speech synthesis unit 142 acquires the speech synthesis result (generally, speech information) and the speech synthesis score "0.87".

Next, the speech synthesis unit 142 configures the speech synthesis processing result from the acquired speech synthesis result and speech synthesis score.

Next, the speech synthesis processing result sending unit 143 sends the speech synthesis processing result with the speech synthesis apparatus identifier "J01" to the control device 11. Here, the speech synthesis result is, for example, a speech information file.

Also, the other speech synthesis apparatuses 14 also send the speech synthesis processing results and the speech synthesis apparatus identifiers to the control device 11 in the same manner as the above-described one of the speech synthesis apparatuses 14.

Next, the speech synthesis processing result receiving unit 1109 in the control device 11 receives the speech synthesis processing result from each of the two or more speech synthesis apparatuses 14 in response to sending of the translation result. Here, it is assumed that the speech synthesis processing result receiving unit 1109 has received a plurality of speech synthesis processing results as shown in FIG. 19.

Next, the speech synthesis result selection unit 1110 selects the speech synthesis result with the highest (best) speech synthesis score by using the speech synthesis scores included in the two or more received speech synthesis processing results, and locates the selected speech synthesis result on the memory. That is, the speech synthesis result selection unit 1110 selects the speech synthesis result corresponding to the speech synthesis apparatus identifier "J01".

Next, the speech synthesis requesting unit 2108 determines that one of the speech synthesis apparatuses 14 from which speech synthesis is requested has not been determined yet.

Next, the speech synthesis apparatus selection unit 2114 temporarily accumulates the speech synthesis scores "(J01, 0.87) (J02, 0.81) (J03, 0.66) . . . " of the speech synthesis apparatuses 14 received by the speech synthesis processing result receiving unit 1109 in association with the speech synthesis apparatus identifiers in a recording medium such as a buffer.

Next, the speech synthesis apparatus selection unit 2114 performs processing for selecting the speech synthesis apparatus 14. That is, the speech synthesis apparatus selection unit 2114 reads out the speech synthesis apparatus selection condition "condition: if (speech synthesis score=0.95) [select (speech synthesis apparatus)]". Then, the speech synthesis score "(J01, 0.87) (J02, 0.81) (J03, 0.66) . . . " are applied to the speech synthesis apparatus selection condition. However, here, the speech synthesis apparatus selection unit 2114 determines that none of the speech synthesis apparatuses 14 satisfies the speech synthesis apparatus selection condition.

Next, the speech synthesis result sending unit 1111 sends the speech synthesis result selected by the speech synthesis result selection unit 1110 to the second terminal apparatus 15 used by the user B.

Next, the second speech receiving unit 154 in the second terminal apparatus 15 receives the speech synthesis result "Good morning". Then, the second speech output unit 155 outputs the speech "Good morning".

With the above-described procedure, "Ohayogozaimasu" uttered by the user A is converted into the speech "Good morning" before reaching the second terminal apparatus 15, and the speech "Good morning" is output to the second terminal apparatus 15.

Also, the speech "Good morning" uttered by the user B of the second terminal apparatus 15 in response to "Good morning" is converted into "Ohayo" with the same processing as described above, and the speech "Ohayo" is output to the first terminal apparatus 10.

It is assumed that the user A and the user B repeats conversation and, for example, the fifth utterance is made by the user A. Then, it is also assumed that the speech recognition apparatus selection unit 2112 has stores therein a speech recognition score group shown in FIG. 25 generated from the first to fifth utterance of the user A and speech recognition processing.

Then, the speech recognition apparatus selection unit 2112 performs processing for selecting the speech recognition apparatus 12 by using the speech recognition score group shown in FIG. 25. That is, the speech recognition apparatus selection unit 2112 acquires the number of times "5" of processing performed so far. The speech recognition apparatus selection unit 2112 reads out the speech recognition apparatus selection condition "condition: number of time=5 or larger, max-score (average-score>=0.85)". Next, the speech recognition apparatus selection unit 2112 applies the number of times "5" of processing performed so far and the speech recognition score group shown in FIG. 25 to the speech recognition apparatus selection condition.

Then, the speech recognition apparatus selection unit 2112 determines that the average value of the score group corresponding to the speech recognition apparatus identifier "R01" is 0.92 and matches the speech recognition apparatus selection condition. Also, the speech recognition apparatus selection unit 2112 determines that the average values of the score groups corresponding to the other speech recognition apparatus identifiers are less than 0.85 and do not match the speech recognition apparatus selection condition.

Then, the speech recognition apparatus selection unit 2112 accumulates the speech recognition apparatus identifier "R01" in the buffer. Subsequently, the speech recognition requesting unit 2102 sends the speech information and the like of the user A only to and requests speech recognition processing only from the speech recognition apparatus 12 identified by the speech recognition apparatus identifier "R01".

Furthermore, it is assumed that the user A and the user B repeats conversation, and for example, the speech synthesis score of the speech synthesis apparatus "J01" with respect to the tenth utterance of the user A has exceeded 0.95. Then, the speech synthesis apparatus selection unit 2114 determines that the speech synthesis apparatus "J01" satisfies the speech synthesis apparatus selection condition.

Then, the speech synthesis apparatus selection unit 2114 selects this speech synthesis apparatus "J01". That is, the speech synthesis apparatus selection unit 2114 accumulates the speech synthesis apparatus identifier "J01" in the buffer. Subsequently, the speech synthesis requesting unit 2108 sends the translation results and the like only to, and requests speech synthesis only from the speech synthesis apparatus 14 identified by the speech synthesis apparatus identifier "J01".

As described above, with the present embodiment, appropriate processing results can be selected from among processing results (speech recognition results, translation results, and speech synthesis results) from server groups each undertaking the same role (two or more speech recognition apparatuses 12, two or more translation apparatuses 13, and two or more speech synthesis apparatuses 14).

Furthermore, with the present embodiment, an appropriate speech recognition apparatus 12, an appropriate translation apparatus 13, or an appropriate speech synthesis apparatus 14 can be automatically selected in the middle of conversation, and after the selection, processing can be requested only from the appropriate speech recognition apparatus 12, the translation apparatus 13, or the speech synthesis apparatus 14. Accordingly, work load on the control device 21 can be reduced, and rapid speech translation processing is possible.

Also, with the present embodiment, appropriate models that match the speech translation control information including speaker attributes can be selected in each processing of speech recognition, translation, and speech synthesis. As a result, a network-type speech translation system with high accuracy, or which inherits speaker's attributes, can be provided.

Note that in the present embodiment, an appropriate speech recognition apparatus 12, an appropriate translation apparatus 13, and an appropriate speech synthesis apparatus 14 can be automatically selected in the middle of conversation, and after the selection, processing can be requested only from the appropriate speech recognition apparatus 12, the translation apparatus 13, and the speech recognition apparatus 14. However, only the speech recognition apparatus 12 may be automatically selected. In this case, the speech translation system includes a control device, two or more speech recognition apparatuses, a translation apparatus, and a speech synthesis apparatus, wherein the control device includes: a speech recognition processing result receiving unit that receives a speech recognition processing result including a speech recognition result for the speech information and a speech recognition score that indicates a probability of speech recognition processing from each of the two or more speech recognition apparatuses; a speech recognition result selection unit that selects a speech recognition apparatus that is most probable by using the speech recognition scores included in the two or more speech recognition processing results received by the speech recognition processing result receiving unit; and a translation requesting unit that sends the speech recognition result selected by the speech recognition result selection unit to the translation apparatus, each speech recognition apparatus includes: a speech receiving unit that receives speech information directly or indirectly from a first terminal apparatus that accepts speech of a first user; a speech recognition unit that performs speech recognition processing on the speech information received by the speech receiving unit, and acquires a speech recognition processing result including a speech recognition result and a speech recognition score that indicates a probability of speech recognition processing; and a speech recognition processing result sending unit that sends the speech recognition processing result acquired by the speech recognition unit to the control device, the translation apparatus includes: a speech recognition result receiving unit that receive the speech recognition result from the control device; a translation unit that performs translation on the speech recognition result received by the speech recognition result receiving unit into a target language, and acquires a translation result; and a translation processing result sending unit that sends the translation result acquired by the translation unit directly or indirectly to the speech synthesis apparatus, the speech synthesis apparatus includes: a translation result receiving unit that receives the translation result; a speech synthesis unit that performs speech synthesis processing on the translation result, and acquires a speech synthesis result; and a speech synthesis processing result sending unit that sends the speech synthesis results directly or indirectly to the second terminal apparatus used by the second user. In this speech translation system, the control device further includes a speech recognition apparatus selection unit that selects a speech recognition apparatus to perform subsequent speech recognition processing from among the two or more speech recognition apparatuses with selection processing for results of one or more times of speech recognition in the speech recognition result selection unit, and the speech recognition requesting unit sends, after the speech recognition apparatus selection unit selects the speech recognition apparatus, the speech only to the selected speech recognition apparatus.

Alternatively, only the translation apparatus 13 may be automatically selected. In this case, the speech translation system includes a control device, a speech recognition apparatus, two or more translation apparatuses, and a speech synthesis apparatus, wherein the control device includes: a translation processing result receiving unit that receives a translation processing result including a result of translation performed on a speech recognition result into a target language and a translation score that indicates a probability of translation processing from each of the two or more translation apparatuses; a translation result selection unit that selects a translation result that is most probable by using the translation scores included in two or more translation processing results received by the translation processing result receiving unit; and a speech synthesis requesting unit that sends the translation result selected by the translation result selection unit directly or indirectly to the speech synthesis apparatus, the speech recognition apparatus includes: a speech receiving unit that receives speech information directly or indirectly from a first terminal apparatus that accepts speech of a first user; a speech recognition unit that performs speech recognition processing on the speech information received by the speech receiving unit, and acquires a speech recognition processing result including a speech recognition result; and a speech recognition processing result sending unit that sends the speech recognition processing result acquired by the speech recognition unit directly or indirectly to the translation apparatuses, each translation apparatus includes: a speech recognition result receiving unit that receives the speech recognition result; a translation unit that performs translation on the speech recognition result received by the speech recognition result receiving unit into a target language, and acquires a translation processing result including a translation result and a translation score that indicates a probability of translation processing; and a translation processing result sending unit that sends the translation processing result acquired by the translation unit to the control device, the speech synthesis apparatus includes: a translation result receiving unit that receives the translation result from the control device; a speech synthesis unit that performs speech synthesis processing on the translation result, and acquires a speech synthesis result; and a speech synthesis processing result sending unit that sends the speech synthesis result directly or indirectly to the second terminal apparatus used by the second user. In this speech translation system, the control device further includes a translation apparatus selection unit that selects a translation apparatus to perform subsequent translation processing from among the two or more translation apparatuses with selection processing for results of one or more times of translation in the translation result selection unit, and the translation requesting unit sends, after the translation apparatus selection unit selects the translation apparatus, the speech recognition result only to the selected translation apparatus.

Alternatively, only the speech synthesis apparatus 14 may be automatically selected. In this case, the speech translation system includes a control device, a speech recognition apparatus, and two or more speech synthesis apparatuses, wherein the control device includes: a speech synthesis processing result receiving unit that receives a speech synthesis processing result including a speech synthesis result and a speech synthesis score that indicates a probability of speech synthesis processing from each of the two or more speech synthesis apparatuses; a speech synthesis result selection unit that selects a speech synthesis result that is most probable by using the speech synthesis scores included in two or more speech synthesis processing results received by the speech synthesis processing result receiving unit; and a speech synthesis result sending unit that sends the speech synthesis result selected by the speech synthesis result selection unit to a second terminal apparatus used by a second user, the speech recognition apparatus comprises: a speech receiving unit that receives speech information directly or indirectly from a first terminal apparatus that accepts speech of a first user; a speech recognition unit that performs speech recognition processing on the speech information received by the speech receiving unit, and acquires a speech recognition result; and a speech recognition processing result sending unit that sends the speech recognition result acquired by the speech recognition unit directly or indirectly to the translation apparatus, the translation apparatus includes: a speech recognition result receiving unit that receives the speech recognition result; a translation unit that performs translation on the speech recognition result received by the speech recognition result receiving unit into a target language, and acquires a translation result; and a translation processing result sending unit that sends the translation result acquired by the translation unit directly or indirectly to the speech synthesis apparatuses, each speech synthesis apparatus includes: a translation result receiving unit that receives the translation result; a speech synthesis unit that performs speech synthesis processing on the translation result, and acquires a speech synthesis processing result including a speech synthesis result and a speech synthesis score that indicates a probability of speech synthesis processing; and a speech synthesis processing result sending unit that sends the speech synthesis processing result to the control device. In this speech translation system, the control device further includes a speech synthesis apparatus selection unit that selects a speech synthesis apparatus to perform subsequent speech synthesis processing from among the two or more speech synthesis apparatuses with selection processing for results of one or more times of speech synthesis in the speech synthesis result selection unit, and the speech synthesis requesting unit sends, after the speech synthesis apparatus selection unit selects the speech synthesis apparatus, the translation result only to the selected speech synthesis apparatus.

Furthermore, the processing in the present embodiment may also be realized by software. Such software may further be distributed by software download or the like. In addition, such software may be recorded on a recording medium such as a CD-ROM and distributed. Note that this applies to other embodiments of the present specification as well. Software that realizes the information processing apparatus of the present embodiment may be a program as described below. That is, the software may be a program as described below. In other words, this program is a program for causing a computer to function as: a speech receiving unit that receives speech information from a first terminal apparatus that accepts speech of a first user; a speech recognition requesting unit that sends the speech information to two or more speech recognition apparatuses respectively; a speech recognition processing result receiving unit that receives, in response to sending of the speech information, two or more speech recognition processing results each including a speech recognition result for the speech information and a speech recognition score that indicates a probability of speech recognition processing from the two or more speech recognition apparatuses; a speech recognition processing result receiving unit that receives, in response to sending of the speech information, two or more speech recognition processing results each including a speech recognition result for the speech information and a speech recognition score that indicates a probability of speech recognition processing from the two or more speech recognition apparatuses; a translation requesting unit that sends the speech recognition result selected by the speech recognition result selection unit to two or more translation apparatuses respectively; a translation processing result receiving unit that receives, in response to sending of the speech recognition result, a translation processing result including a result of translation performed on the speech recognition result into a target language and a translation score that indicates a probability of translation processing from each of the two or more translation apparatuses; a translation result selection unit that selects a translation result that is most probable by using the translation scores included in two or more translation processing results received by the translation processing result receiving unit; a speech synthesis requesting unit that sends the translation result selected by the translation result selection unit to two or more speech synthesis apparatuses respectively; a speech synthesis processing result receiving unit that receives, in response to sending of the translation result, a speech synthesis processing result including a speech synthesis result for the translation result and a speech synthesis score that indicates a probability of speech synthesis processing from each of the two or more speech synthesis apparatuses; a speech synthesis result selection unit that selects a speech synthesis result that is most probable by using the speech synthesis scores included in two or more speech synthesis processing results received by the speech synthesis processing result receiving unit; and a speech synthesis result sending unit that sends the speech synthesis result selected by the speech synthesis result selection unit to a second terminal apparatus used by a second user.

Furthermore, it is preferable that the above-described program further function as: a speech recognition apparatus selection unit that selects a speech recognition apparatus to perform subsequent speech recognition processing from among the two or more speech recognition apparatuses with selection processing for results of one or more times of speech recognition in the speech recognition result selection unit; a translation apparatus selection unit that selects a translation apparatus to perform subsequent translation processing from among the two or more translation apparatuses with selection processing for results of one or more times of translation in the translation result selection unit; and a speech synthesis apparatus selection unit that selects a speech synthesis apparatus to perform subsequent speech synthesis processing from among the two or more speech synthesis apparatuses with selection processing for results of one or more times of speech synthesis in the speech synthesis result selection unit, wherein the speech recognition requesting unit sends, after the speech recognition apparatus selection unit selects the speech recognition apparatus, the speech only to the selected speech recognition apparatus, the translation requesting unit sends, after the translation apparatus selection unit selects the translation apparatus, the speech recognition result only to the selected translation apparatus, and the speech synthesis requesting unit sends, after the speech synthesis apparatus selection unit selects the speech synthesis apparatus, the translation result only to the selected speech synthesis apparatus.

In the above-described embodiments, the exemplary speech translation control information is shown in FIG. 11 and FIG. 12. However, there is no restriction to the format of the speech translation control information. Needless to say, the speech translation control information may be in an XML format as shown in FIG. 26. The description language of the speech translation control information shown in FIG. 26 is called speech translation markup language, or STML. Referring to FIG. 26, a user ID (information "Mike" for identifying a speaking user), a format or size (MaxNBest="2") of an output result of speech recognition, a source language "English" (language="en"), information for identifying a translation target (here, Task="Dictation"), a conversation domain (here, "Travel"), and information indicating an input speech format (here, "ADPCM") are described. Also, in FIG. 26, among speaker attributes the gender (here, "male"), the age (here, "30"), and whether being a native or not (here, "no") are described. Also, in FIG. 26, information indicating an output text format (here, "SurfaceForm") is described. Further, the speech translation control information may also include information indicating an output speech format, information for designating voice quality of input/output speech, information indicating an input text format, and the like. The above-mentioned (MaxNBest="2") indicates that the top two candidates of speech recognition results are output and sent. Note that "Nbest" means the top N candidates of speech recognition results.

Needless to say, in the present specification, sending of information to one of the apparatuses may be direct sending of information to one of the apparatuses, or indirect sending of information to one of the apparatuses via other devices.

FIG. 27 shows the external appearance of a computer that realizes the control device and the like in the speech translation system in the foregoing embodiments by executing the programs described in the present specification. The foregoing embodiments may be realized using computer hardware and a computer program executed thereon. FIG. 27 is a schematic diagram of this computer system 340, and FIG. 28 is a diagram showing an internal configuration of the computer system 340.

Referring to FIG. 27, the computer system 340 includes a computer 341 including an FD drive 3411 and a CD-ROM drive 3412, a keyboard 342, a mouse 343, and a monitor 344.

Referring to FIG. 28, the computer 341 is connected not only to the FD drive 3411 and the CD-ROM drive 3412, but also to an MPU 3413, a bus 3414 connected to the CD-ROM drive 3412 and the FD drive 3411, and a ROM 3415 for storing a program such as a boot up program, and includes a RAM 3416 for temporarily storing a command of an application program and providing a temporary storage area, and a hard disk 3417 for storing an application program, a system program, and data. Although not shown here, the computer 341 may further include a network card that provides connection to a LAN.

The program for causing the computer system 340 to execute the functions of the control device and the like in the foregoing embodiments may be stored in an CD-ROM 3501 or an FD 3502, which are inserted into the CD-ROM drive 3412 or the FD drive 3411, and may also be transferred to the hard disk 3417. Alternatively, the program may be sent via a network (not shown) to the computer 341 and stored in the hard disk 3417. At the time of execution, the program is loaded into the RAM 3416. The program may be loaded from the CD-ROM 3501, the FD 3502, or directly from the network.

The program does not necessarily have to include, for example, an operating system (OS), a third party program, or the like to cause the computer 341 to execute the functions of the control device and the like in the foregoing embodiments. The program may only include portions of commands for calling an appropriate function (module) in a controlled mode and obtaining desired results. The manner in which the computer system 340 operates is well known, and therefore a detailed description thereof is omitted.

It should be noted that, in the above-described program, processes performed by hardware, for example, a process performed by a modem, an interface card, or the like in the step of sending (a process performed only by hardware) is not included in the step of sending information, the step of receiving information, and the like.

Furthermore, the computer that executes the above-described program may be a single computer, or may be multiple computers. More specifically, centralized processing may be performed, or distributed processing may be performed.

Needless to say, in the forgoing embodiments, two or more communication means included in a single apparatus may be realized by a physically single medium.

Furthermore, in the foregoing embodiments, each process (each function) may be realized as an integrated process using a single apparatus (system), or may be realized as a distributed process using multiple apparatuses. Note that in the case where each processing (each function) is intensively performed by a single apparatus (system), the speech translation system is a single apparatus, and the control device, the speech recognition apparatus, the translation apparatus, and the speech synthesis apparatus are contained in the single apparatus. In this case, the above-described sending and receiving of information is exchange of information. That is, the above-described sending and receiving are broadly interpreted.

The present invention is not limited to the embodiments set forth herein, and various modifications are possible. Needless to say, such modifications are also embraced in the scope of the present invention.

Industrial Applicability

As described above, the speech translation system of the present invention has an effect that in speech translation, processing results from a plurality of speech recognition apparatuses, a plurality of translation apparatuses, and a plurality of speech synthesis apparatuses are selectively used, or appropriate apparatuses are selected from among a plurality of speech recognition apparatuses, a plurality of translation apparatuses, or a plurality of speech synthesis apparatuses, and is useful as a speech translation system or the like.

BRIEF DESCRIPTION OF THE DRAWINGS

FIG. 11 shows an example of speech translation control information of Embodiment 1.

FIG. 12 shows an example of the speech translation control information of Embodiment 1.

FIG. 13 shows a speech recognition model selection information management table of Embodiment 1.

FIG. 14 shows a translation model selection information management table of Embodiment 1.

FIG. 15 shows a speech synthesis model selection information management table of Embodiment 1.

FIG. 16 shows an input screen of a first terminal apparatus of Embodiment 1.

FIG. 17 shows an example of a plurality of speech recognition processing results of Embodiment 1.

FIG. 18 shows an example of a plurality of translation processing results of Embodiment 1.

FIG. 19 shows an example of a plurality of speech synthesis processing results of Embodiment 1.

FIG. 20 shows an example of speech translation control information of Embodiment 1.

FIG. 25 shows a speech recognition score group of Embodiment 2.

FIG. 26 shows a format of speech translation control information of Embodiment 2.

Figure 1:
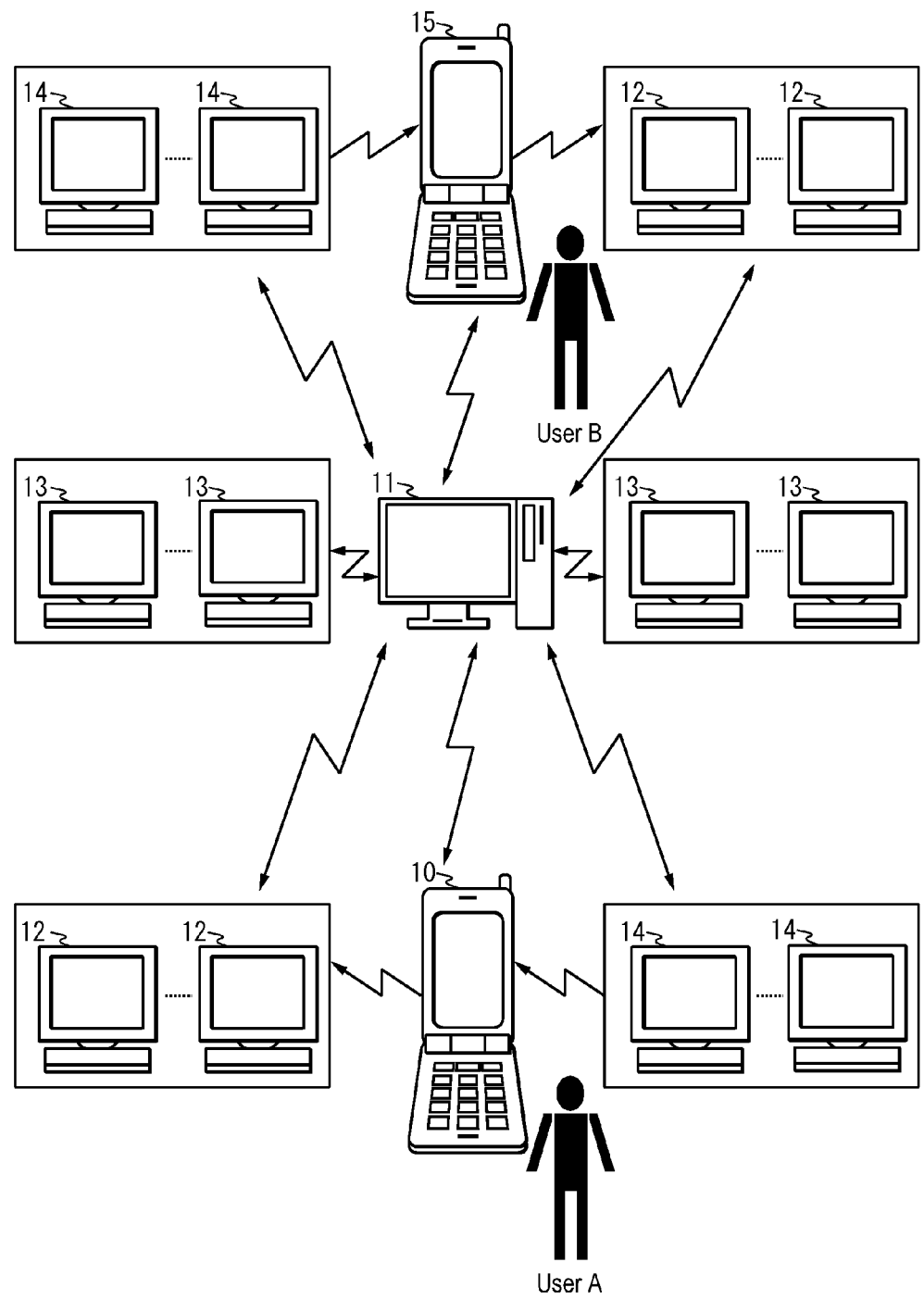
FIG. 1 is a conceptual diagram of a speech translation system of Embodiment 1.
Figure 2:
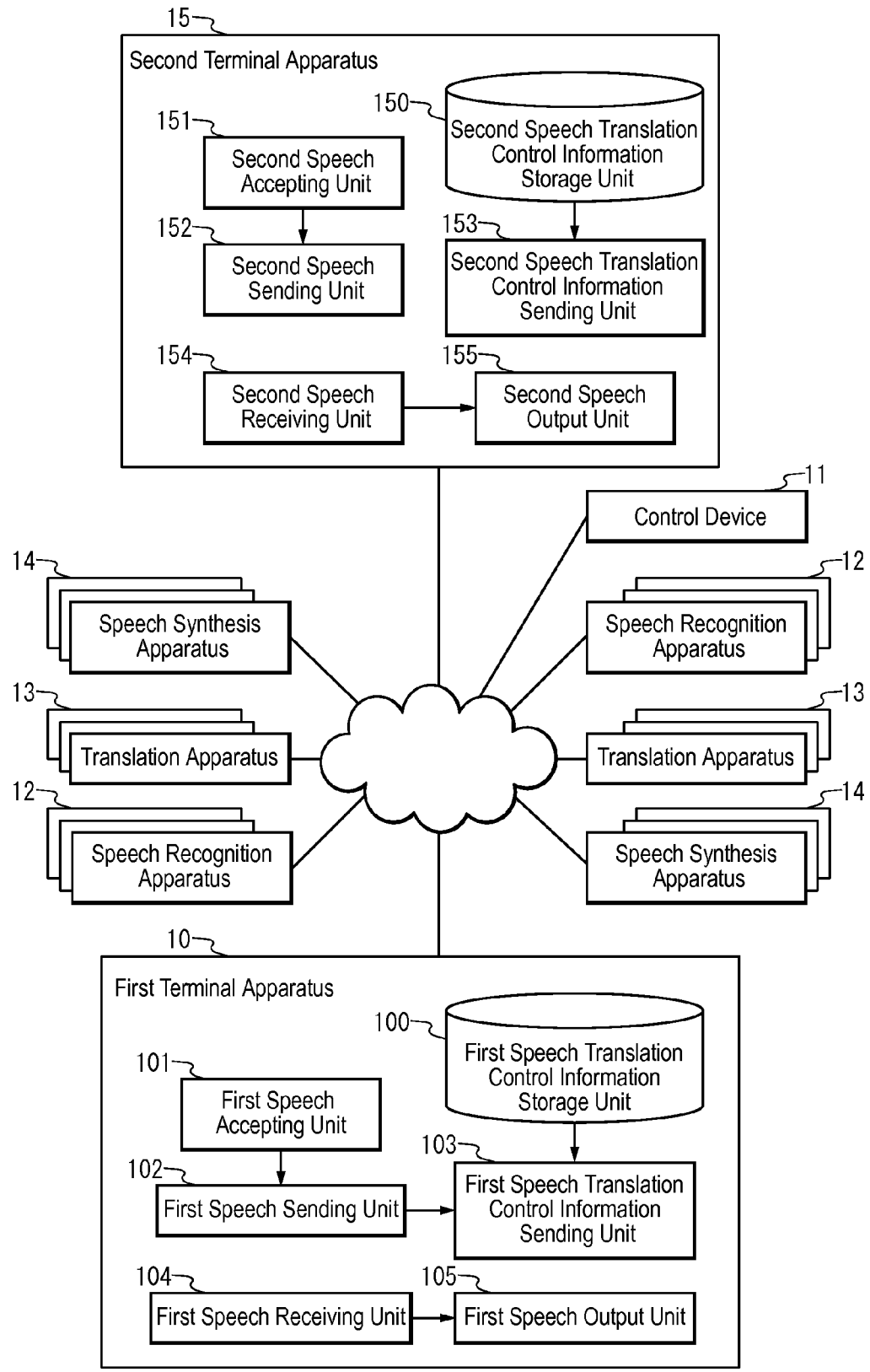
FIG. 2 is a block diagram showing a configuration of the speech translation system of Embodiment 1.
Figure 3:
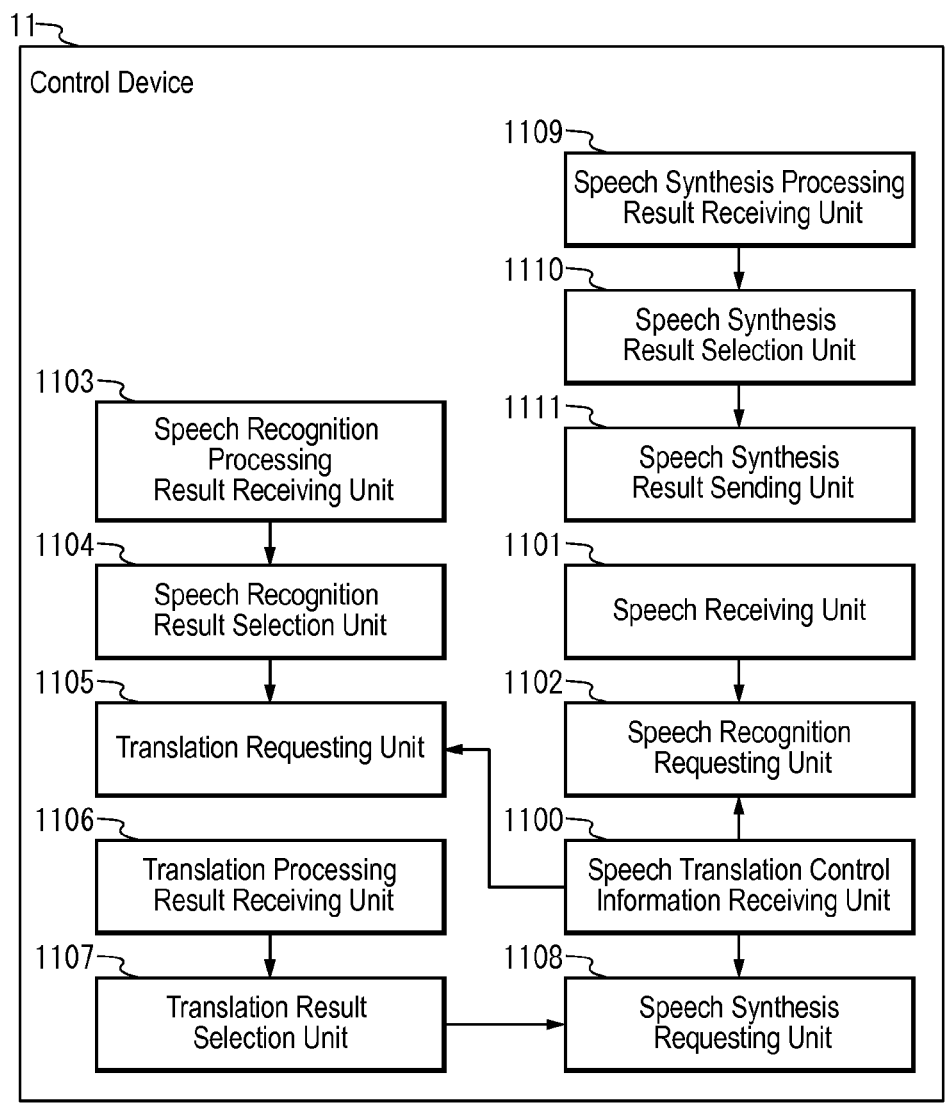
FIG. 3 is a block diagram showing a configuration of a control device of Embodiment 1.
Figure 4:
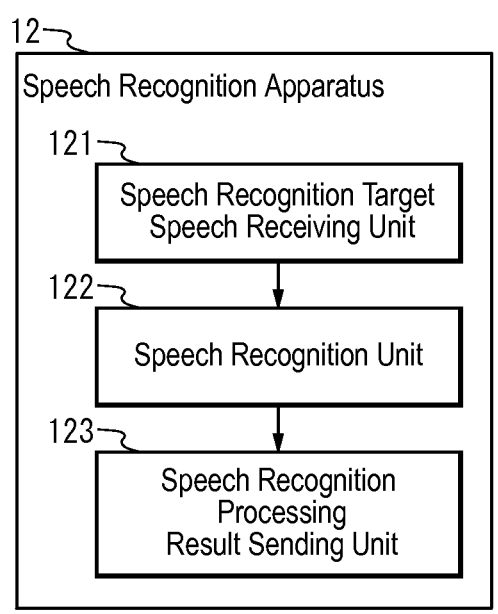
FIG. 4 is a block diagram showing a configuration of a speech recognition apparatus of Embodiment 1.
Figure 5:
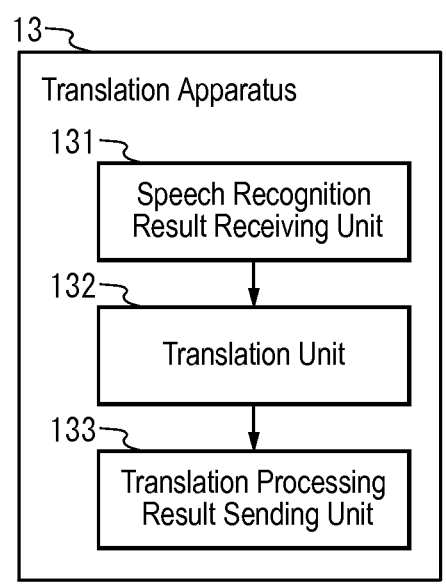
FIG. 5 is a block diagram showing a configuration of a translation apparatus of Embodiment 1.
Figure 6:
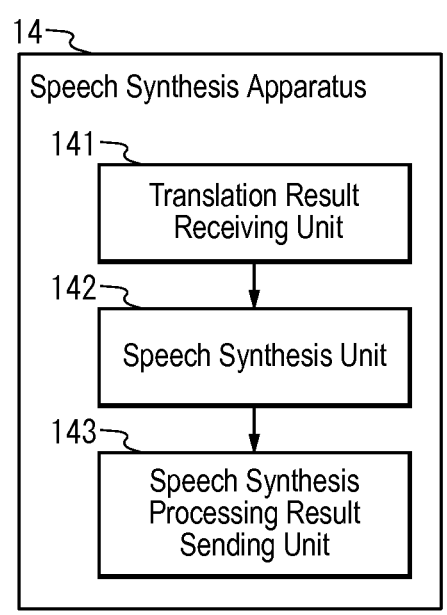
FIG. 6 is a block diagram showing a configuration of a speech synthesis apparatus of Embodiment 1.
Figure 7:
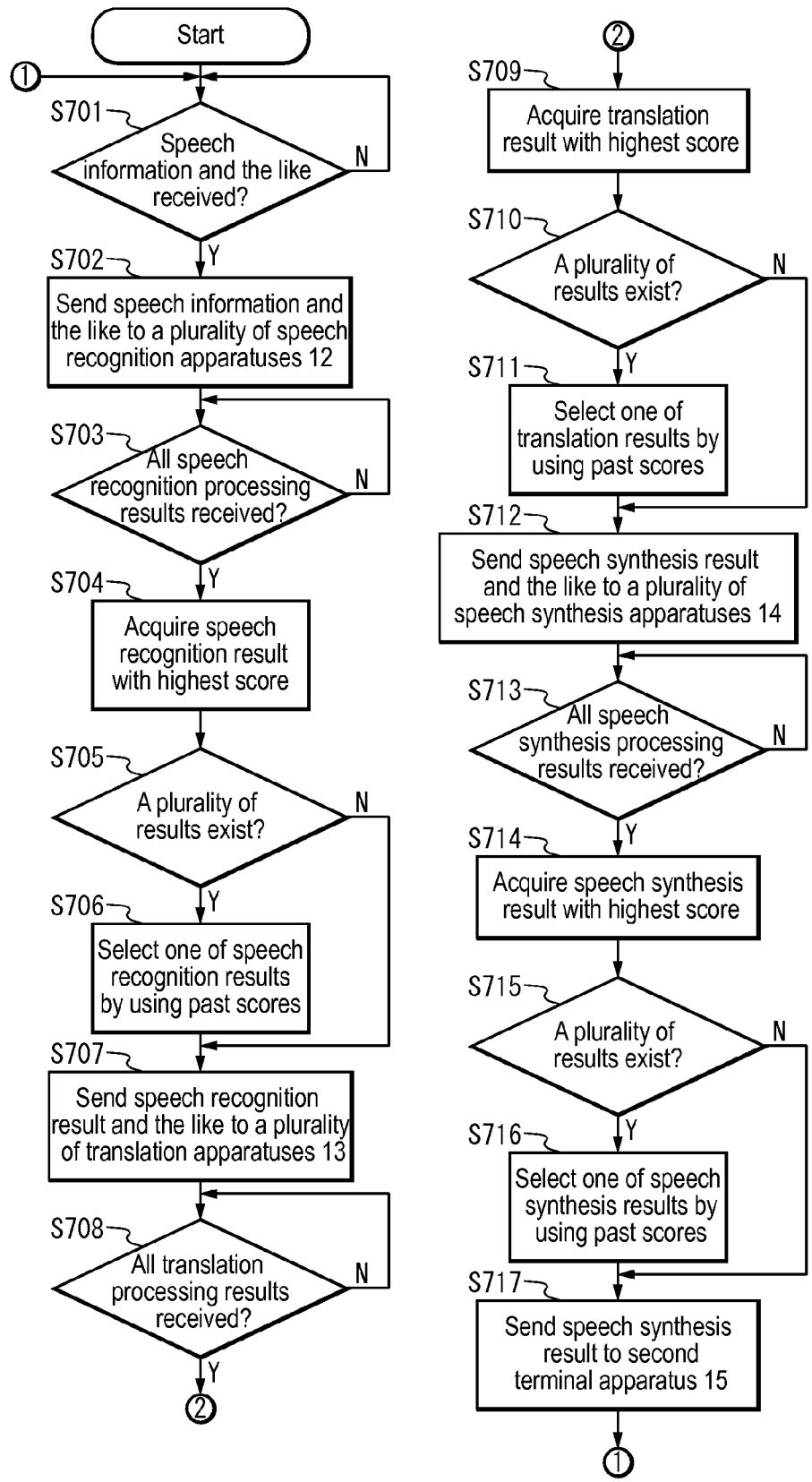
FIG. 7 is a flowchart illustrating the control device of Embodiment 1.
Figure 8:
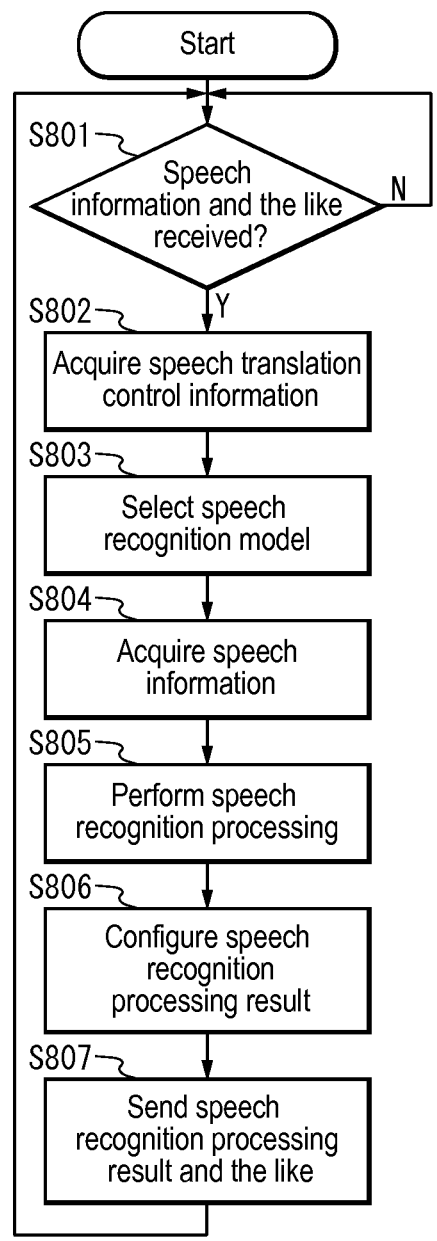
FIG. 8 is a flowchart illustrating an operation of the speech recognition apparatus of Embodiment 1.
Figure 9:
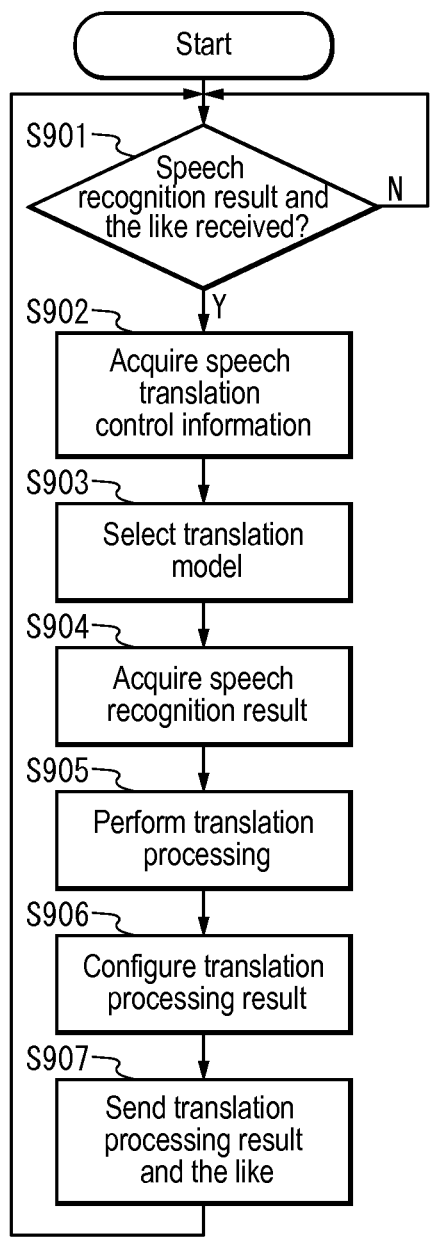
FIG. 9 is a flowchart illustrating an operation of the translation apparatus of Embodiment 1.
Figure 10:
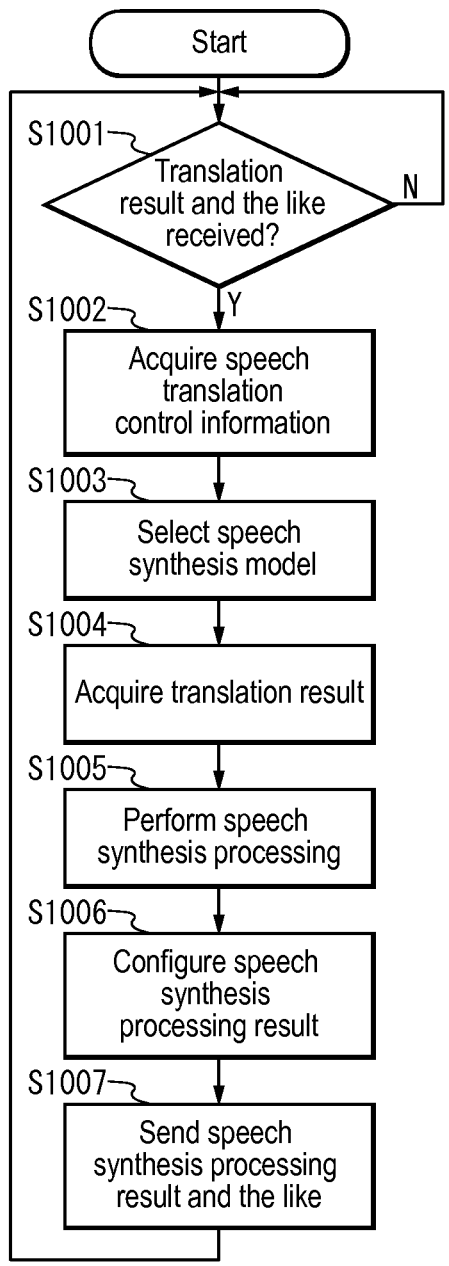
FIG. 10 is a flowchart illustrating an operation of the speech synthesis apparatus of Embodiment 1.
Figure 21:
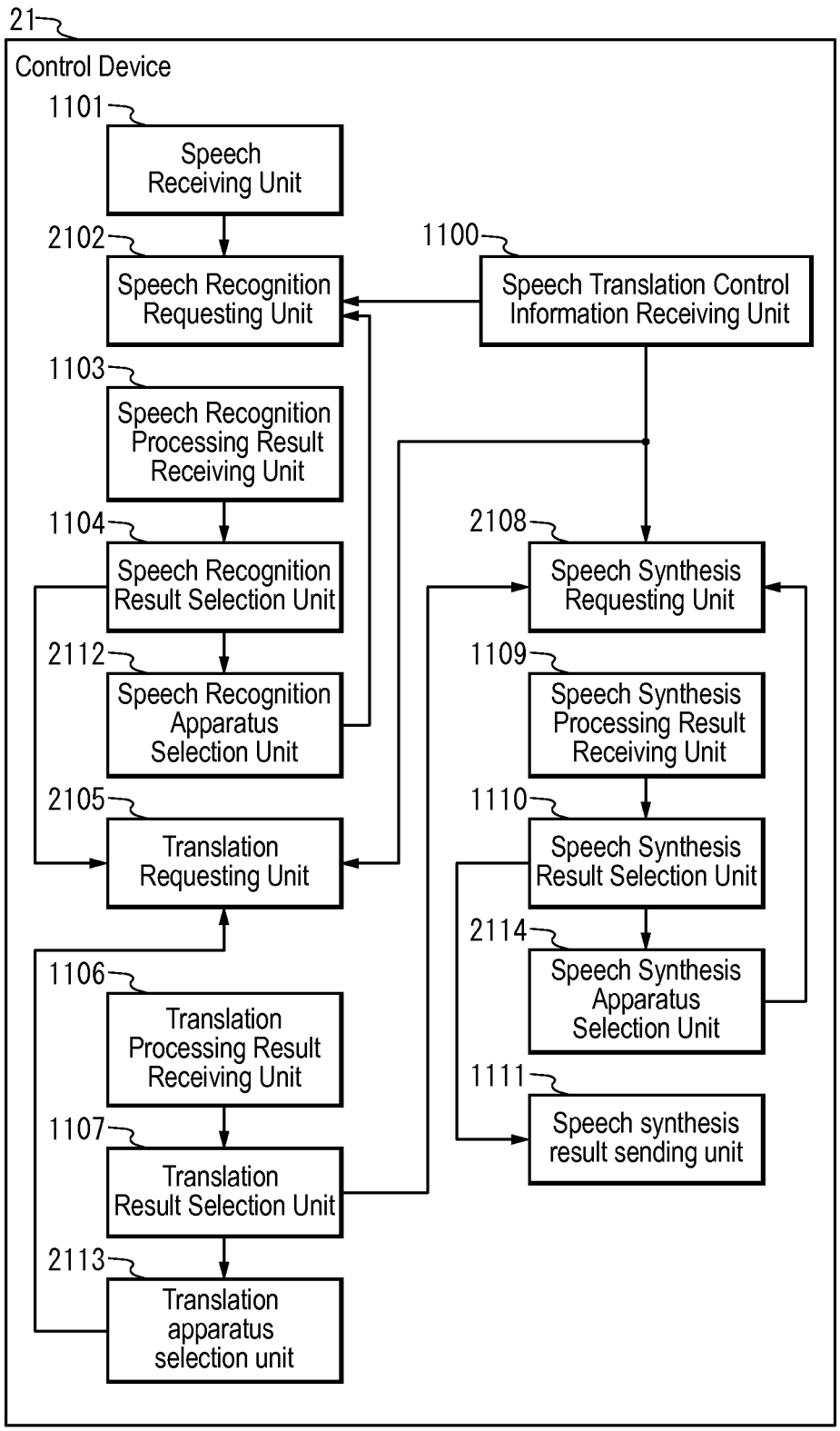
FIG. 21 is a block diagram showing a configuration of a control device of Embodiment 2.
Figure 22:
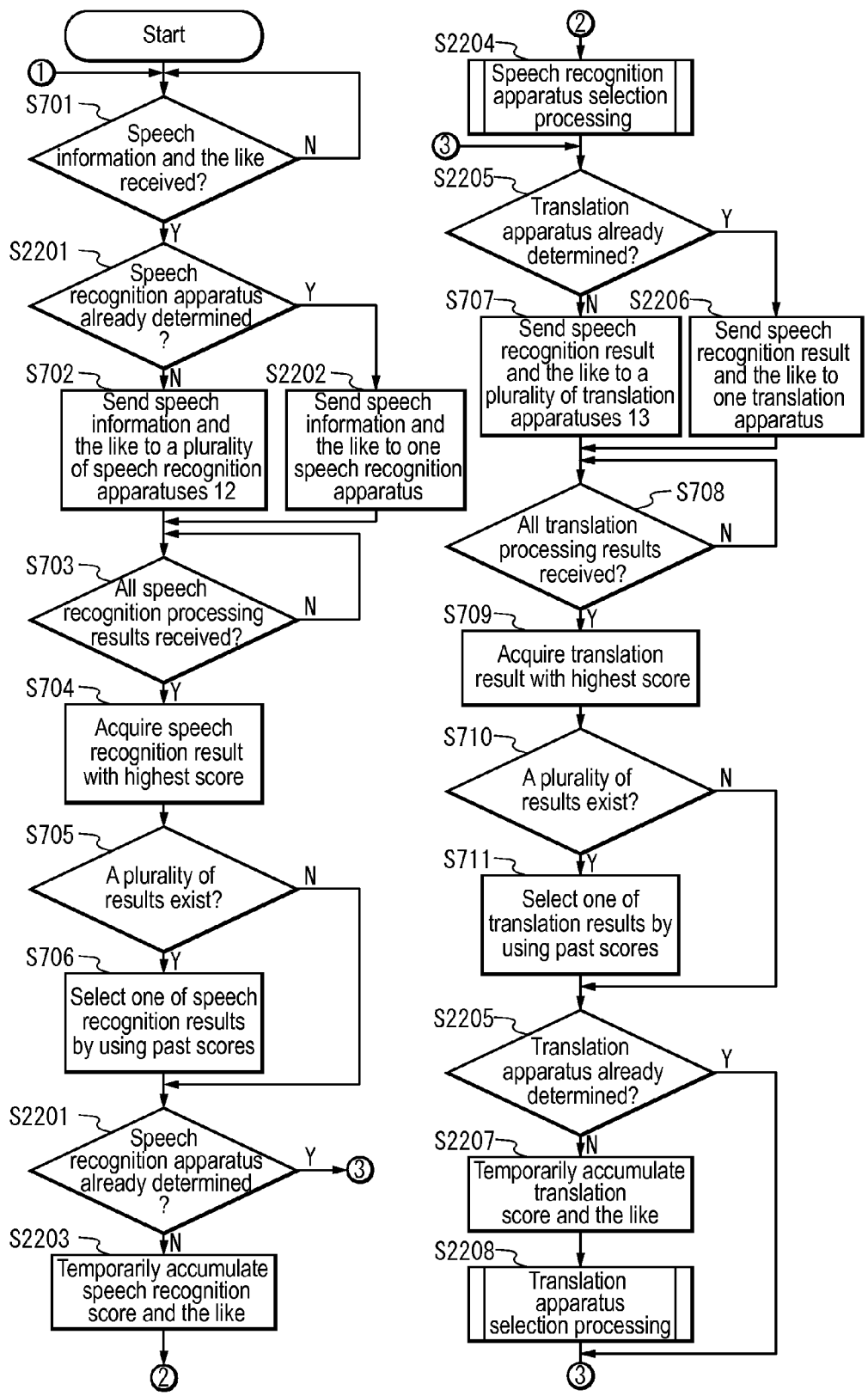
FIG. 22 is a flowchart illustrating an operation of a speech translation system of Embodiment 2.
Figure 23:
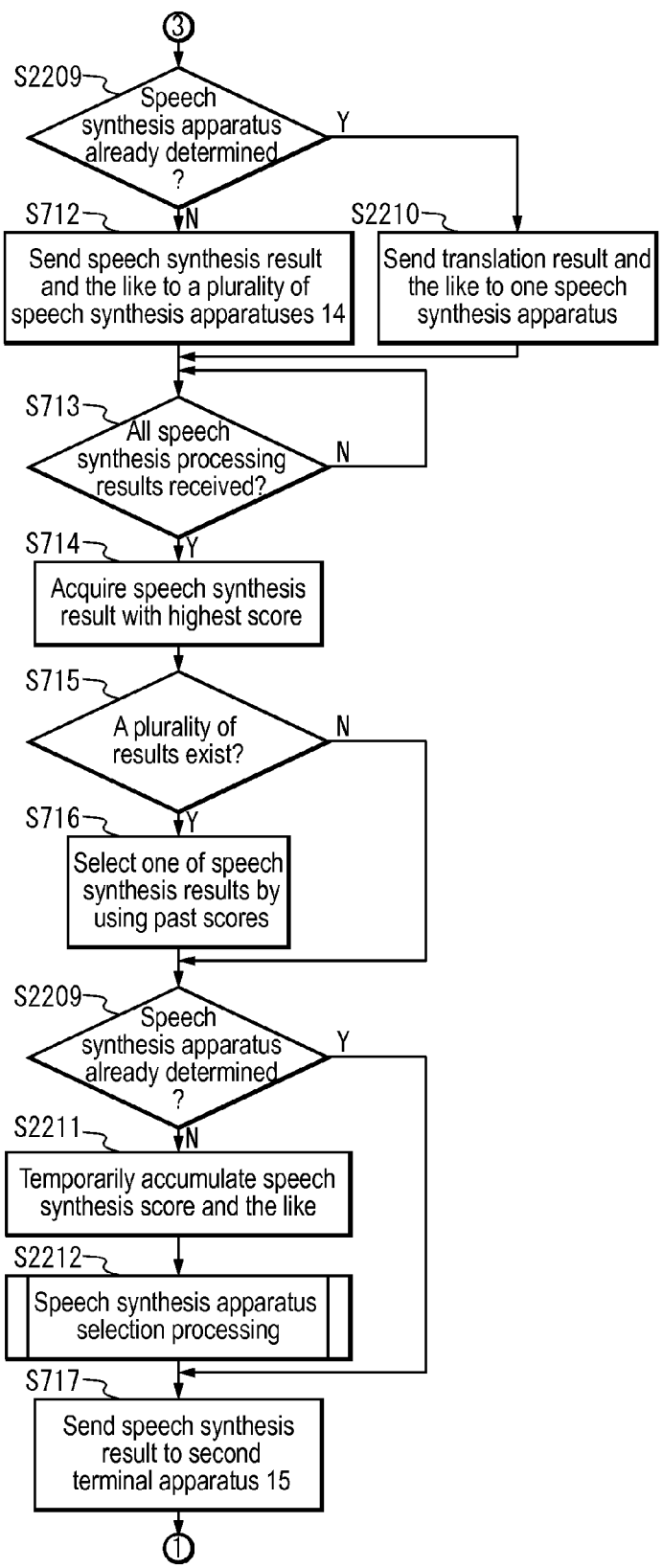
FIG. 23 is a flowchart illustrating an operation of the speech translation system of Embodiment 2.
Figure 24:
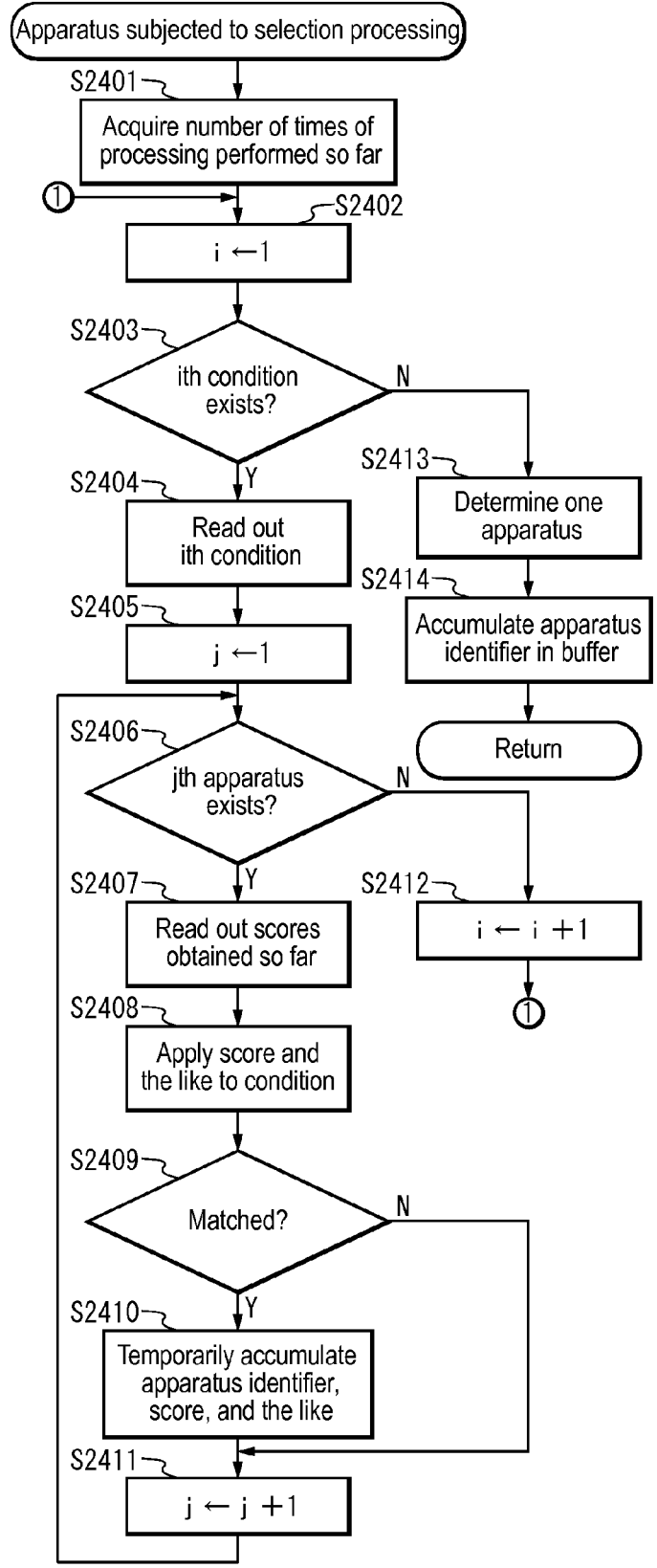
FIG. 24 is a flowchart illustrating an operation of speech recognition apparatus selection processing of Embodiment 2.
Figure 27:
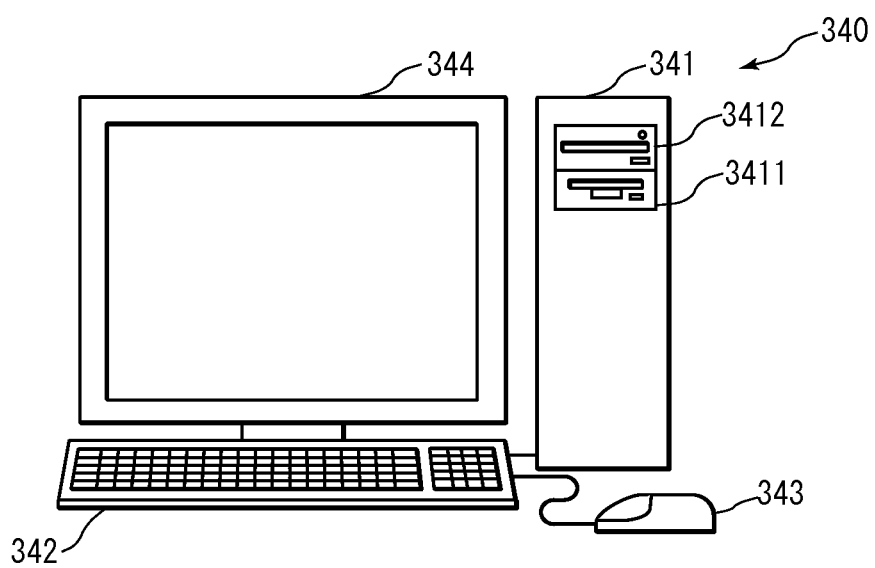
FIG. 27 is a schematic diagram of a computer system of the foregoing embodiments.
Figure 28:
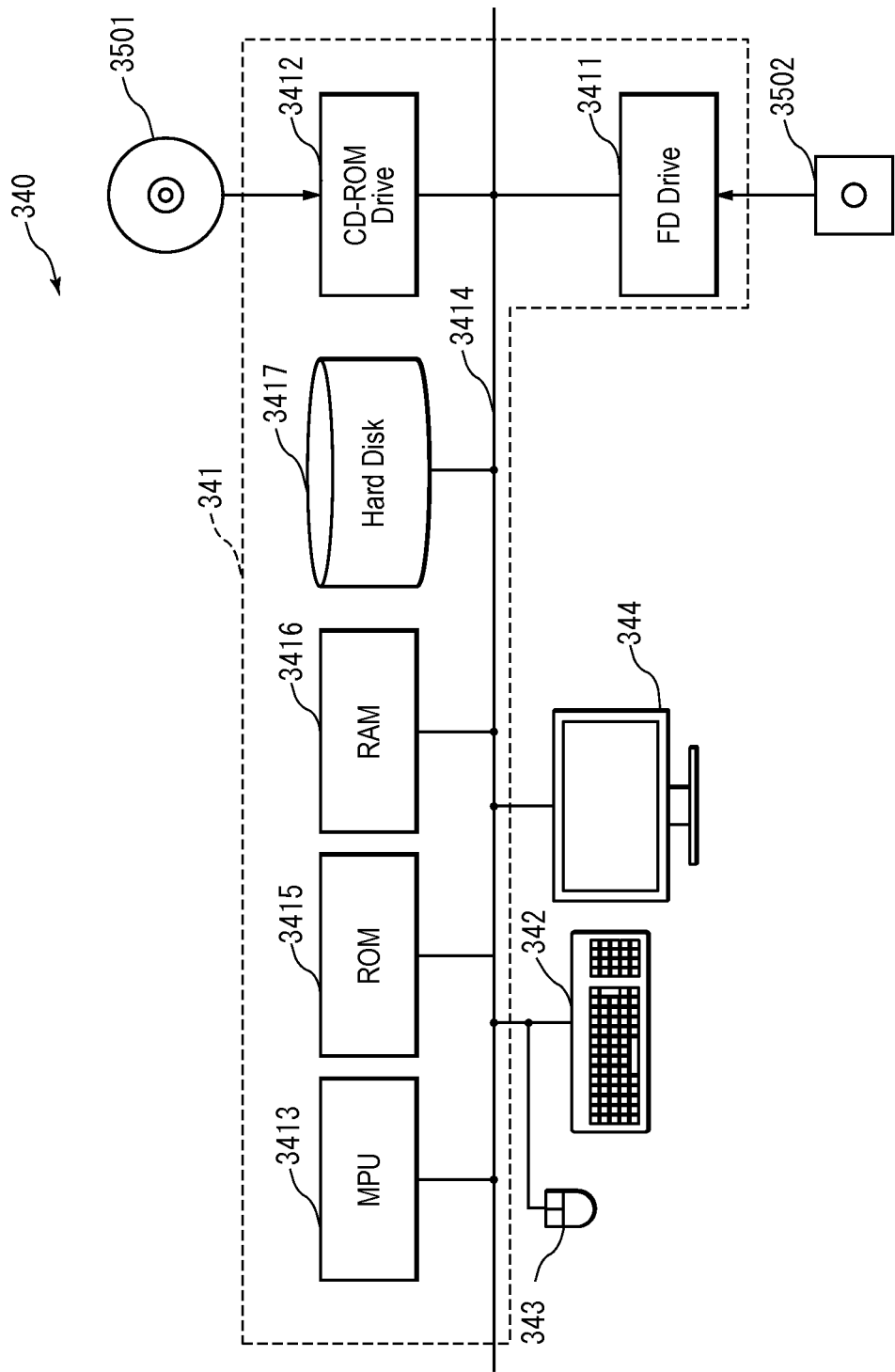
FIG. 28 is a block diagram showing a configuration of the computer system of the foregoing embodiments.

The invention claimed is:

1. A speech translation system comprising
a control device,
two or more speech recognition apparatuses,
two or more translation apparatuses, and
two or more speech synthesis apparatuses,
Wherein the control device comprises:
a speech recognition requesting unit, which requests a speech recognition process from each of the two or more speech recognition apparatuses at the beginning of a conversation;
a speech recognition processing result receiving unit, which receives two or more speech recognition processing results each including a speech recognition result and a speech recognition score from the two or more speech recognition apparatuses;
a speech recognition result selection unit which selects a speech recognition result that corresponds to the highest speech recognition score;
a speech recognition apparatus selection unit, which selects the speech recognition apparatus that produced the selected speech recognition result, and directs the speech recognition requesting unit to use only the selected speech recognition apparatus thereafter;
wherein the control device further comprises a counter, which counts the number of utterances processed by the speech recognition apparatus, wherein
if the highest score meets or exceeds a predetermined threshold, the selected speech recognition apparatus is selected for all further speech recognition processing, and
if the highest score does not meet the predetermined threshold, the control unit tracks the number of times the speech recognition process has run, receives subsequent speech recognition scores from each speech recognition apparatus, and averages those scores with prior speech recognition scores, compares the average scores to the threshold, and selects the speech recognition apparatus with the highest average score for further processing, wherein if at any time in the conversation the average score for a speech recognition apparatus meets or exceeds the threshold, that apparatus is selected for all further processing.

2. The speech translation system according to claim 1, wherein the control device further comprises:
a translation apparatus selection unit that selects a translation apparatus to perform subsequent translation processing from among the two or more translation apparatuses with selection processing for results of one or more times of translation in the translation result selection unit; and
a speech synthesis apparatus selection unit that selects a speech synthesis apparatus to perform subsequent speech synthesis processing from among the two or more speech synthesis apparatuses with selection processing for results of one or more times of speech synthesis in the speech synthesis result selection unit,
the translation requesting unit sends, after the translation apparatus selection unit selects the translation apparatus, the speech recognition result only to the selected translation apparatus, and
the speech synthesis requesting unit sends, after the speech synthesis apparatus selection unit selects the speech synthesis apparatus, the translation result only to the selected speech synthesis apparatus.

3. A control device comprising:
a speech receiving unit that receives speech information from a first terminal apparatus that accepts speech of a first user;
a speech recognition requesting unit that sends the speech information to two or more speech recognition apparatuses respectively;
a speech recognition processing result receiving unit that receives, in response to sending of the speech information, two or more speech recognition processing results each including a speech recognition result for the speech information and a speech recognition score that indicates a probability of speech recognition processing from the two or more speech recognition apparatuses;
a speech recognition result selection unit that selects a speech recognition result that is most probable by using the speech recognition scores included in the two or more speech recognition processing results;
a translation requesting unit that sends the speech recognition result selected by the speech recognition result selection unit to two or more translation apparatuses respectively;
a translation processing result receiving unit that receives, in response to sending of the speech recognition result, a translation processing result including a result of translation performed on the speech recognition result into a target language and a translation score that indicates a probability of translation processing from each of the two or more translation apparatuses;
a translation result selection unit that selects a translation result that is most probable by using the translation scores included in two or more translation processing results received by the translation processing result receiving unit;
a speech synthesis requesting unit that sends the translation result selected by the translation result selection unit to two or more speech synthesis apparatuses respectively;
a speech synthesis processing result receiving unit that receives, in response to sending of the translation result, a speech synthesis processing result including a speech synthesis result for the translation result and a speech synthesis score that indicates a probability of speech synthesis processing from each of the two or more speech synthesis apparatuses;
a speech synthesis result selection unit that selects a speech synthesis result that is most probable by using the speech synthesis scores included in two or more speech synthesis processing results received by the speech synthesis processing result receiving unit; and
a speech synthesis result sending unit that sends the speech synthesis result selected by the speech synthesis result selection unit to a second terminal apparatus used by a second user,
wherein the control device further comprises:
a speech recognition apparatus selection unit, which selects the speech recognition apparatus that produced the selected speech recognition result, and directs the speech recognition requesting unit to use only the selected speech recognition apparatus thereafter;

wherein the control device further comprises a counter, which counts the number of utterances processed by the speech recognition apparatus, wherein if the highest score meets or exceeds a predetermined threshold, the selected speech recognition apparatus is selected for all further speech recognition processing, and if the highest score does not meet the predetermined threshold, the control unit tracks the number of times the speech recognition process has run, receives subsequent speech recognition scores from each speech recognition apparatus, and averages those scores with prior speech recognition scores, compares the average scores to the threshold, and selects the speech recognition apparatus with the highest average score for further processing, wherein if at any time in the conversation the average score for a speech recognition apparatus meets or exceeds the threshold, that apparatus is selected for all further processing.

4. A speech translation system comprising a control device, two or more speech recognition apparatuses, two or more translation apparatuses, and two or more speech synthesis apparatuses, wherein the control device comprises:

a translation apparatus requesting unit, which requests a translation process from each of the two or more translation apparatuses at the beginning of a conversation;

a translation processing result receiving unit, which receives two or more translation processing results each including a translation result and a translation score from the two or more translation apparatuses;

a translation result selection unit, which selects a translation result that corresponds to the highest translation score; and a translation apparatus selection unit, which selects the translation apparatus that produced the selected translation result, and directs the translation apparatus requesting unit to use only the selected translation apparatus thereafter;

wherein the control device further comprises a counter, which counts the number of utterances processed by the translation apparatus, wherein if the highest score meets or exceeds a predetermined threshold, the selected translation apparatus is selected for all further speech recognition processing, and if the highest score does not meet the predetermined threshold, the control unit tracks the number of times the translation process has run, receives subsequent translation scores from each translation apparatus, and averages those scores with prior translation scores, compares the average scores to the threshold, and selects the translation apparatus with the highest average score for further processing, wherein if at any time in the conversation the average score for a translation apparatus meets or exceeds the threshold, that apparatus is selected for all further processing.

5. A speech translation system comprising a control device, two or more speech recognition apparatuses, two or more translation apparatuses, and two or more speech synthesis apparatuses, wherein the control device comprises:

a speech synthesis apparatus requesting unit, which requests a speech synthesis process from each of the two or more speech synthesis apparatuses at the beginning of a conversation;

a speech synthesis processing result receiving unit, which receives two or more speech synthesis processing results each including a speech synthesis result and a speech synthesis score from the two or more speech synthesis apparatuses;

a speech synthesis result selection unit, which selects a speech synthesis result that corresponds to the highest speech synthesis score; and a speech synthesis apparatus selection unit, which selects the speech synthesis apparatus that produced the selected speech synthesis result, and directs the speech synthesis apparatus requesting unit to use only the selected speech synthesis apparatus thereafter;

wherein the control device further comprises a counter, which counts the number of utterances processed by the speech synthesis apparatus, wherein if the highest score meets or exceeds a predetermined threshold, the selected speech synthesis apparatus is selected for all further speech recognition processing, and if the highest score does not meet the predetermined threshold, the control unit tracks the number of times the speech synthesis process has run, receives subsequent speech synthesis scores from each speech synthesis apparatus, and averages those scores with prior speech synthesis scores, compares the average scores to the threshold, and selects the speech synthesis apparatus with the highest average score for further processing, wherein if at any time in the conversation the average score for a speech synthesis apparatus meets or exceeds the threshold, that apparatus is selected for all further processing.

* * * * *